US009908291B2

(12) United States Patent
Mech

(10) Patent No.: US 9,908,291 B2
(45) Date of Patent: Mar. 6, 2018

(54) SMOOTH 3D PRINTING USING MULTI-STAGE FILAMENTS

(71) Applicant: Adobe Systems Incorporated, San Jose, CA (US)

(72) Inventor: Radomir Mech, Mountain View, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 1171 days.

(21) Appl. No.: 14/041,045

(22) Filed: Sep. 30, 2013

(65) Prior Publication Data

US 2015/0091200 A1 Apr. 2, 2015

(51) Int. Cl.
B29C 67/00 (2017.01)
B33Y 10/00 (2015.01)
B33Y 50/02 (2015.01)
B29C 47/00 (2006.01)
B29C 47/92 (2006.01)

(52) U.S. Cl.
CPC ...... *B29C 67/0074* (2013.01); *B29C 47/0011* (2013.01); *B29C 47/92* (2013.01); *B29C 67/0055* (2013.01); *B29C 67/0088* (2013.01); *B33Y 10/00* (2014.12); *B33Y 50/02* (2014.12)

(58) Field of Classification Search
CPC . B29C 67/0074; B29C 47/92; B29C 47/0011; B29C 67/0055; B29C 67/0088; B33Y 10/00; B33Y 50/02
USPC ..... 264/401, 308, 40.7; 425/375, 150, 174.4
See application file for complete search history.

(56) References Cited

U.S. PATENT DOCUMENTS

| 5,303,141 | A | * | 4/1994 | Batchelder | B29C 41/36 156/244.11 |
|---|---|---|---|---|---|
| 5,653,925 | A | | 8/1997 | Batchelder | |
| 8,414,280 | B2 | * | 4/2013 | Pettis | G06F 3/12 264/308 |
| 8,920,697 | B2 | * | 12/2014 | Mikulak | B29C 47/025 264/255 |
| 9,199,414 | B2 | | 12/2015 | Mech | |
| 9,592,530 | B2 | * | 3/2017 | Rodgers | C08L 77/02 |
| 9,607,889 | B2 | * | 3/2017 | Renn | H01C 17/06 |
| 9,714,153 | B2 | * | 7/2017 | Beery | B65H 49/36 |
| 9,738,031 | B2 | * | 8/2017 | Mikulak | B29C 64/118 |
| 2004/0265413 | A1 | * | 12/2004 | Russell | B29C 67/0059 425/375 |
| 2007/0179657 | A1 | * | 8/2007 | Holzwarth | B33Y 50/02 700/119 |
| 2011/0199104 | A1 | * | 8/2011 | Paul | G01N 27/22 324/679 |

(Continued)

OTHER PUBLICATIONS

"Non-Final Office Action", U.S. Appl. No. 13/868,869, dated Oct. 2, 2014, 15 pages.

(Continued)

*Primary Examiner* — Nahida Sultana
(74) *Attorney, Agent, or Firm* — Wolfe-SBMC

(57) ABSTRACT

This document describes techniques and apparatuses for smooth 3D printing using multi-stage filaments. These techniques are capable of creating smoother surfaces than many current techniques. In some cases, the techniques determine a portion of a surface of a 3D object that includes, or will include, a printing artifact or is otherwise not smooth, and then applies multi-stage filaments to provide a smoothing surface over that portion.

20 Claims, 24 Drawing Sheets

(56) References Cited

U.S. PATENT DOCUMENTS

| | | | |
|---|---|---|---|
| 2011/0202142 A1 | 8/2011 | Mao et al. | |
| 2014/0048970 A1* | 2/2014 | Batchelder | B29C 67/0055 264/129 |
| 2014/0064194 A1* | 3/2014 | Schliwa-Bertling | H04W 28/06 370/329 |
| 2014/0070461 A1* | 3/2014 | Pax | B29C 67/0055 264/401 |
| 2014/0284832 A1 | 9/2014 | Novikov et al. | |
| 2014/0311651 A1 | 10/2014 | Mech | |
| 2015/0064299 A1* | 3/2015 | Koreis | G06Q 30/0603 425/375 |
| 2015/0076732 A1* | 3/2015 | Kemmer | B29C 67/0055 264/255 |
| 2015/0140150 A1* | 5/2015 | Schmehl | B33Y 10/00 425/150 |

OTHER PUBLICATIONS

"Notice of Allowance", U.S. Appl. No. 13/868,869, dated Aug. 26, 2015, 7 pages.

"Final Office Action", U.S. Appl. No. 13/868,869, dated Apr. 8, 2015, 13 pages.

* cited by examiner

SMOOTH 3D PRINTING USING MULTI-STAGE FILAMENTS

BACKGROUND

Current techniques for three-dimensional (3D) printing include photopolymerization, granular-materials binding, and fused deposition modeling. In the case of fused deposition modeling, layers of material, such as sugar, plastic, or metal, are extruded, often in the form of small beads that make up strings, also called "filaments." Through extruding layer after layer of these filaments a 3D object is created. These 3D objects can include highly complex designs. In fact, almost anything that a computer can model, a fused-deposition printer can create, from candy art, to a plastic chair, to a metal sculpture.

Current fused-deposition modeling techniques, however, often fail to produce smooth surfaces. This is due in part to the size of the filaments. When a change is made from one layer to another layer, a "step" is created that is about the size of the filament's cross-section. These steps can appear as lines or ridges, which limits both the accuracy and the aesthetics of 3D objects created through fused deposition techniques.

The background description provided herein is for the purpose of generally presenting the context of the disclosure. Work of the presently named inventor, to the extent the work is described in this background section, as well as aspects of the description that may not otherwise qualify as prior art at the time of filing, are neither expressly nor impliedly admitted as prior art against the present disclosure.

SUMMARY

This document describes techniques and apparatuses for smooth 3D printing using multi-stage filaments. These techniques are capable of creating smoother surfaces than many current techniques. In some cases, the techniques determine a portion of a surface of a 3D object that includes, or will include, a printing artifact or is otherwise not smooth, and then applies multi-stage filaments to provide a smoothing surface over that portion.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Conventional techniques and apparatuses for three-dimensional (3D) printing often result in stepped surfaces or other undesired production artifacts. This disclosure describes techniques and apparatuses capable of creating smoother surfaces using multi-stage filaments.

The following discussion describes an operating environment, optional techniques for providing support structures, techniques that may be employed in the operating environment for smooth 3D printing using multi-stage filaments, and a System-on-Chip (SoC) in which component(s) of the operating environment can be embodied. In the discussion below, reference is made to the operating environment by way of example only.

Operating Environment

Figure 1:
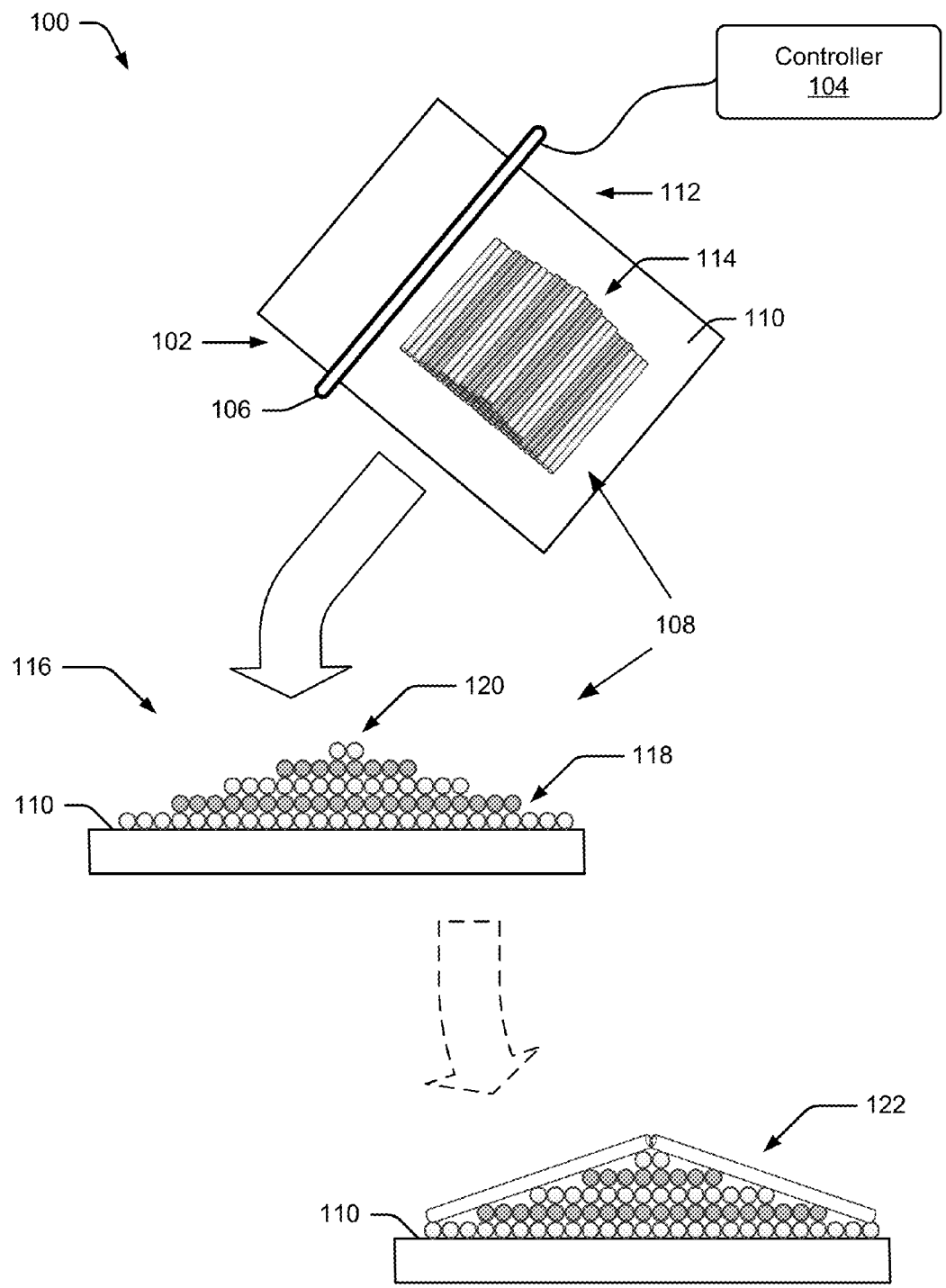
FIG. 1 illustrates an operating environment having a 3D printing device, a controller, and a filament-providing element building a 3D object.

FIG. 1 illustrates an operating environment 100 that includes a 3D printing device 102 having a controller 104 and a filament-providing element 106. 3D printing device 102 is capable of building a 3D object 108, shown built over a plate 110. Here plate 110 remains fixed while filament-providing element 106 is mechanically advanced, though filament-providing element 106 may instead be moved and plate 110 remain fixed (or both may move). 3D printing device 102 optionally includes sensors 112, which are capable of measuring 3D object 108, such as filament locations, angles, and widths.

FIG. 1 illustrates 3D object 108 from two perspectives, a plan perspective 114 (looking from above) and a side perspective 116. Plan perspective 114 illustrates filaments applied to build 3D object 108, with white and grey filaments provided in their respective stages. Side perspective 116 shows 3D object 108 from a side (not a cross section), and illustrates a multi-stage production artifact having steps 118 on either side rising to a ridge 120. One example manner in which the techniques may produce smooth surfaces is illustrated at smooth surface 122, which shows multi-stage filaments provided over the five stages shown. This is but one example of the techniques shown simply as an introduction. The techniques and other smooth surfaces will be described in greater detail below.

Figure 2:
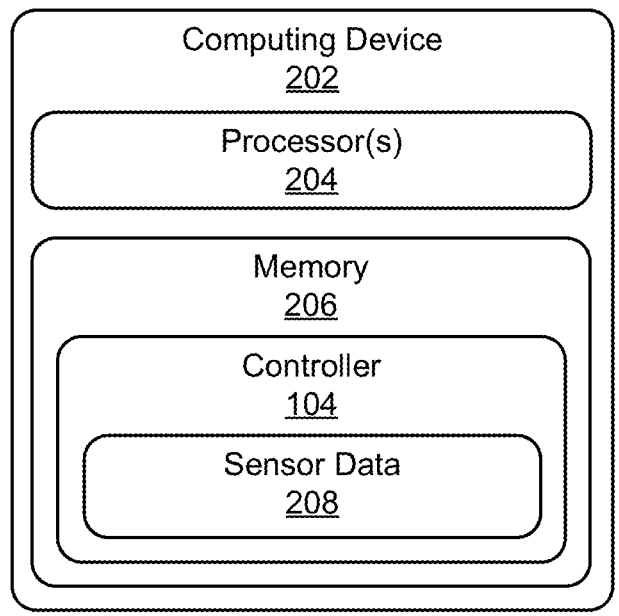
FIG. 2 illustrates a computing device having the controller of FIG. 1.

FIG. 2 is an illustration of a computing device 202 having an example embodiment of controller 104. Computing device 202 includes one or more processors 204 and computer-readable storage memory ("memory") 206. Memory 206 includes controller 104, which includes or has access to sensor data 208 (from sensors 112 of FIG. 1). Controller 104 can control, and/or process data from, 3D printing device 102 effective to perform smooth 3D printing using multi-stage filaments. In this example embodiment, controller 104 acts through control of filament-providing element 106.

Controller 104 optionally may also provide filaments at varying thicknesses, such as by causing filament-providing element 106 to speed up or slow down application of filaments. Further, filament-providing element 106 may be capable of heating material being extruded, thereby also enabling controller 104 to cause filament characteristics to be altered, including on-the-fly. These characteristics may include thickness/thinness, viscosity, and stiffness. By altering characteristics of the filament, controller 104 may control a flexibility of a multi-stage (or single stage) filament, which can affect a distance between supports over which the filament may be applied before the filament "droops" or sinks into a space between the supports. The filament characteristics can also be altered to affect structural strength of 3D object 108 or smoothness of structures (e.g., ramps, peaks, and so forth). Further, this control by controller 104 can be on-the-fly, such as based on sensor data 208 from sensors 112, thereby providing a feedback loop as to a smoothness or structural soundness resulting from currently applied filaments.

Filament-providing element 106 may extrude filaments, such as continuously or with closely-spaced beads that, when placed, adhere to each other to create filaments. Filaments, however, are not necessarily extruded. Other manners of printing material may be used, including applying previously created filaments, such as from a spool of filament, as well as other manners known in the art for applying materials in 3D printing. Whether or not extruded, filament-providing element 106 can provide filaments having various cross-sections, such as circular, elliptical, and rectangular, to name but a few. These cross-sections can affect offsets, structures, and smoothness of 3D object 108.

Filament-providing element 106 may include a filament head (not shown) that, because of its size, affects multi-stage application of filaments, as the filament head can contact the filament being applied or already-applied stages of filaments, often to negative effect. The size and physical characteristics of the filament head can be used to determine appropriate portions of a surface to apply a smoothing surface, such as artifacts having more than a 20, 30, or 45 degree rate of rise, based on the filament head potentially contacting the object or filaments being applied.

Controller 104 also causes filament-providing element 106 to place filaments over more than a single stage. Thus, controller 104 can cause filaments to be applied over multiple existing stages, which requires additional movement in a vertical direction (e.g., a Z direction of X, Y, and Z noted in some figures) either by the filament-providing element 106, a filament head, or plate 110.

Controller 104 may also apply filaments at a precision greater than a width of the filaments in at least one dimension when producing support structures using offset printing. In one example, assume that each stage of printing is performed in an [X,Y] plane, with each additional stage altering a Z dimension, in which case this precision is in the X or Y dimension. Furthermore, this precision can also operate in two or even all three of these dimensions, such as with multi-stage filaments, stages of filaments provided in non-planar contours, offsets provided at angles relative to neighboring filaments, or filaments applied in curved shapes within a planar or non-planar stage. These examples are described below.

As noted, controller 104 is capable of causing 3D printing device 102 to provide a smoothing surface through multi-stage filaments. Controller 104, in some examples, is further capable of causing 3D printing device 102 to build support structures over which a smoothing surface is provided. These support structures can be made up of additional support filaments to reduce support-to-support distances (e.g., those between steps) and thus to reduce or eliminate droop of the multi-stage filaments in the smoothing surface. In some cases the support structures replace stages and in some cases they are applied over stages modeled or already built.

In some cases support structures are built using offset printing techniques. These offset printing techniques are described in significant detail below, though they are not required for use of the techniques for smooth 3D printing using multi-stage filaments. Offset printing techniques include both non-parallel filaments and parallel filaments, both of which are described below.

Ways in which entities of FIGS. 1 and 2 act and interact are also set forth in greater detail below. The entities illustrated can be separate or integrated to the extent permitted by the techniques described herein. While controller 104 is shown as computer-executable instructions executable by processor(s) 204, it may instead be hardware or firmware, or a combination of hardware, firmware, and/or software.

Optional Techniques for Providing Support Structures

Three example types of support structures are described below, none of which are necessarily required for use of the techniques for smooth 3D printing using multi-stage filaments. In the first example, comparatively less-complex additional support structures (compared to those of the second and third examples) are provided to reduce or eliminate droop of the multi-stage filaments of the smoothing surface. In the second example, offset printing is used to create support structures using non-parallel filaments separated by progressive offsets separating neighboring non-parallel filaments. These progressive offsets progress from a larger separation to a smaller separation or vice versa between neighboring non-parallel filaments. In the third example, offset printing is used to create support structures using parallel filaments.

Optional Support Structures—First Example

In this first example, the multi-stage filaments to be provided for the smoothing surface are assumed to droop if the distance between supports is great than four times the width of the multi-stage filaments (which is here the same as that of the prior printing stages). Consider FIG. 3, which illustrates a computer model of a 3D object, modeled object 302, in cross-section having three stages 304, 306, and 308. Modeled object 302 has two production artifacts, steps 310 and 312, having support-to-support distances 314 and 316 equal to a width of six filaments. Here the techniques alter how the stages are produced as this first illustration is based on a computer model showing how the 3D object would look without use of the techniques.

Rather than build modeled object 302 to have these stages, the techniques instead build 3D object 318 by altering application of filaments in stages 304, 306, and 308 to include two additional support structures 320 and 322. These support structures 320 and 322 reduce the support-to-support distance from about six filaments to about three filaments, shown at reduced support-to-support distances 324, 326, 328, and 330. By so doing, the techniques eliminate droop for multi-stage filaments that will later be applied to create a smoothing surface. Ways in which multi-stage filaments are applied to provide a smoothing surface are described in detail after the three support-structure examples.

Optional Support Structures Using Offset Printing, Generally

Controller 104 may also or instead cause 3D printing device 102 to build a support structure by providing parallel filaments having linear offsets separating the parallel filaments. In providing parallel or non-parallel filaments, controller 104 may do so in stages, the stages having a contour that may be planar or non-planar. Each of these stages can be applied one after the other, though this is not required. Controller 104, for example, may provide some filaments of a stage, then provide, over these filaments, portions of another stage, and then return to the prior stage and so forth.

Note that, while some filaments are referred to herein as being applied as parallel filaments, the term "parallel" is intended to convey that the parallel filaments are substantially parallel. Thus, some parallel filaments can be exactly parallel while others are within as much as about 10 degrees of exactly parallel, while some others are within about five degrees of exactly parallel. Therefore, the term "parallel" as used herein means within 0 to about 10 degrees of exact parallel. Non-parallel filaments can be nearly parallel or substantially non-parallel, and thus from about perpendicular (90%) from parallel to as few as a couple of degrees from parallel. In some cases, for example, progressive offsets can be used to provide a long transition from a contour of one stage to a contour of the next stage, such that the first stage includes non-parallel filaments being as few as a couple of degrees from parallel.

After providing these non-parallel or parallel filaments, controller 104 may cause 3D printing device 102 to provide, over the offsets (whether progressive or linear), another stage of filaments. As noted in part above, these filaments can be provided at the offsets and fill in, in whole or in part, these offsets. This other stage of filaments is also part of the support structure over which a smoothing surface is provided.

Optional Support Structures Using Parallel Offsets—Second Example

The following discussion describes examples for providing support structures using parallel offsets. These methods and others described herein may utilize the previously described environment, such as controller 104 of FIG. 1. Methods described herein are shown as a set of operations performed by one or more entities. These methods are not necessarily limited to the orders shown for performing the operations, and can be performed together or separate in whole or in part.

Figure 4:
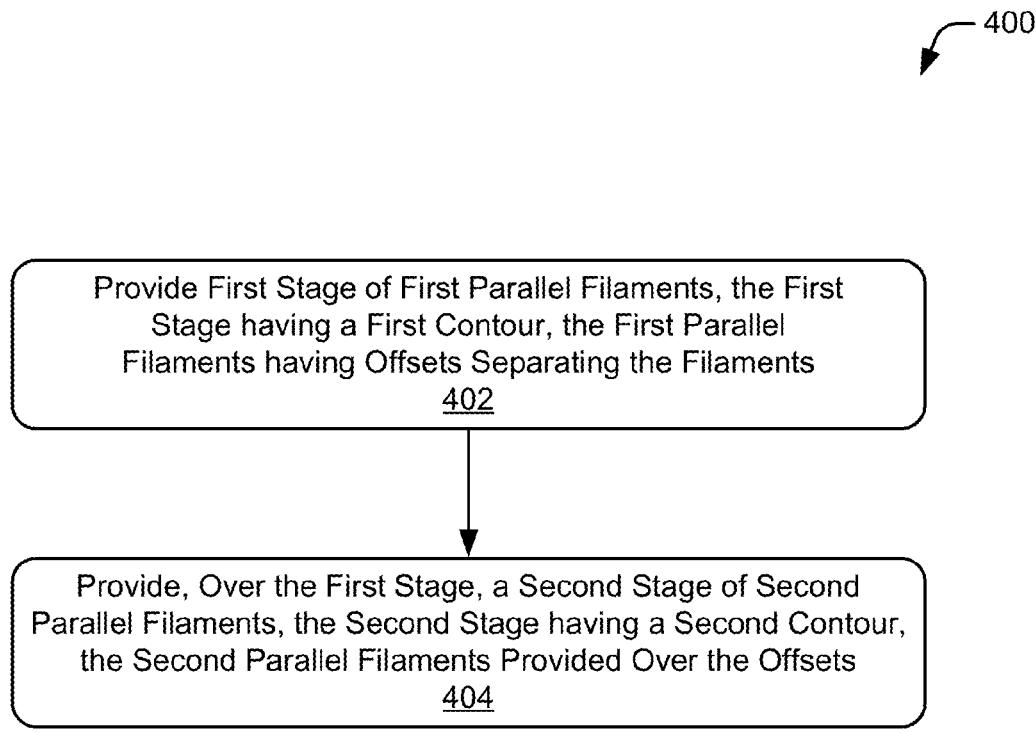
FIG. 4 illustrates an example method for providing support structures using parallel-filament offset 3D printing.
Figure 5:
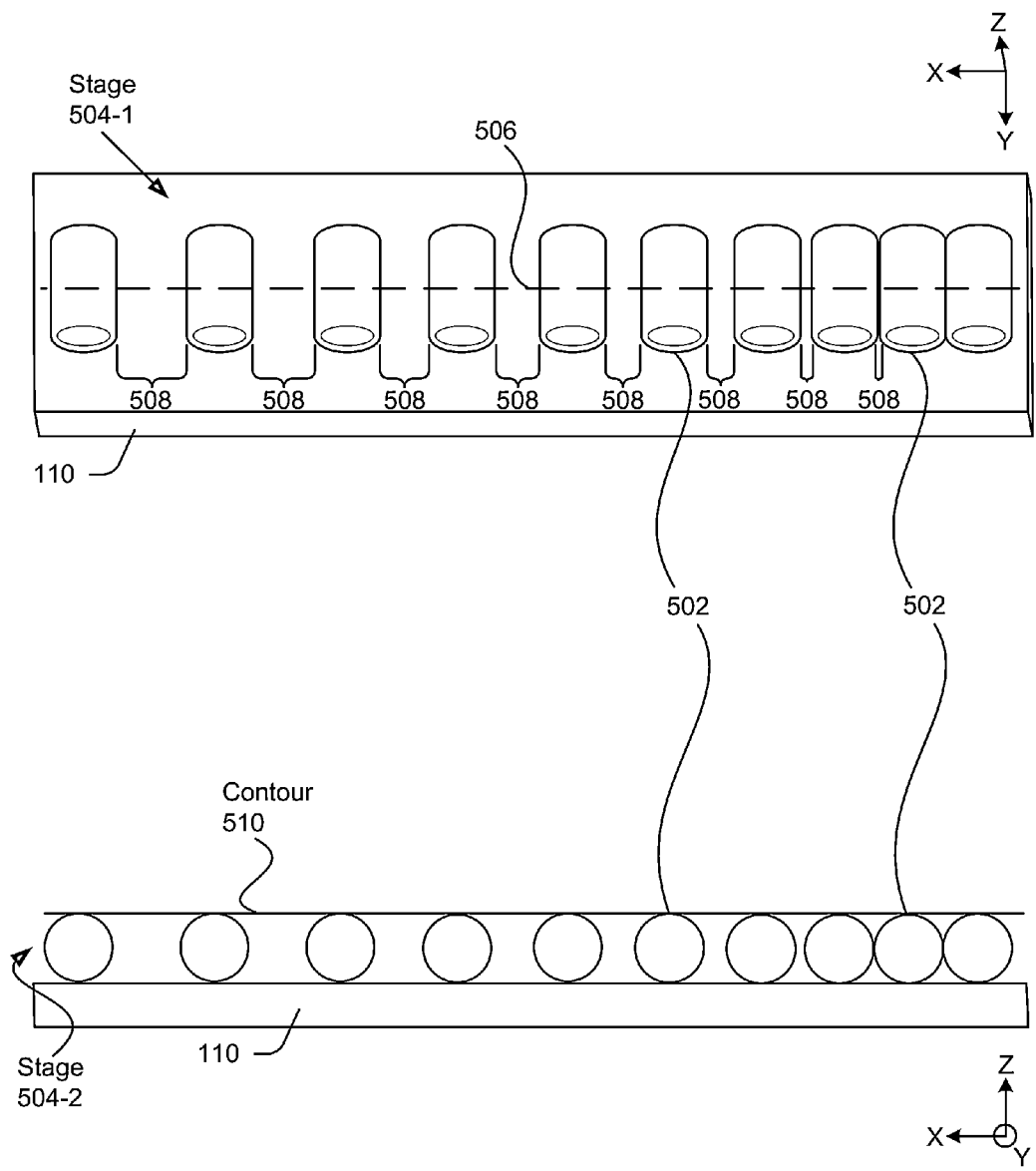
FIG. 5 illustrates a stage of parallel filaments having offsets separating the parallel filaments. This stage is illustrated in plan and cross-sectional views.

FIG. 4 depicts methods 400 for providing support structures using parallel-filament offset 3D printing. At 402, a stage of parallel filaments is provided. These parallel filaments 502 are illustrated in FIG. 5 and are provided having offsets separating the parallel filaments. This is illustrated in plan and cross-sectional views. A stage 504 is shown in plan view at 504-1 and in cross-section view (along line 506) at 504-2. Note that stage 504 includes offsets 508 and is provided having a contour 510, which is a plane in the X and Y dimension (the Z dimension is also shown) that intersects a top-most portion of parallel filaments 502.

These offsets 508 can proceed from larger offset widths to smaller offset widths, which is effective to cause the parallel filaments placed over larger offsets to be closer to contour 510 than parallel filaments placed over the smaller offsets. In FIG. 5, offsets 508 are shown to vary from about as wide as a filament to nearly zero.

Figure 6:
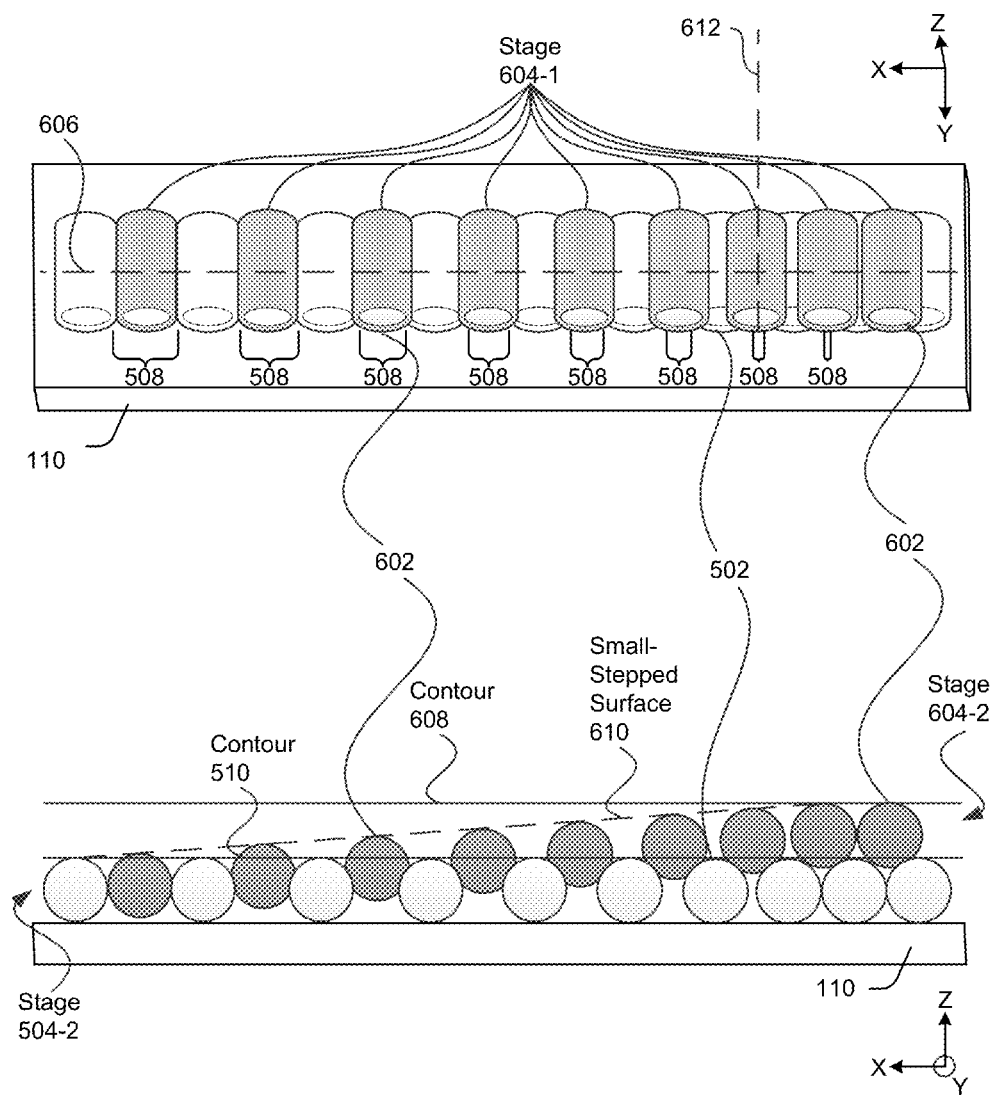
FIG. 6 illustrates another stage of parallel filaments, this other stage provided over the offsets of the first stage of parallel filaments shown in FIG. 5. This other stage is illustrated in plan and cross-sectional views.

At 404, another stage of parallel filaments is provided over the offsets of the first stage of parallel filaments. This is illustrated, as part of the ongoing example, in FIG. 6. FIG. 6 shows elements of FIG. 5, including stages 504 and contour 510, along with parallel filaments 602 of stage 604. Stage 604 is shown in plan view at 604-1 and in cross section view at 604-2 (along line 606). Stage 604 has a contour 608, which is also a plane in the X and Y dimension, though located about a filament widths' higher in the Z dimension than contour 510. Note that a top edge of parallel filaments 602 of stage 604 resides in between contour 510 and contour 608. This is effective to provide a small-stepped surface 610, which progressively moves from contour 510 to contour 608.

While not required, at 404 controller 104 may cause filament-providing element 106 to provide parallel filaments 602 at a midline 612 of offsets 508 (one of these midlines is shown in FIG. 6). This provision at midlines is illustrated in FIG. 6, though methods 400 may instead provide filaments off-centered from the midline. Filaments, depending on their material characteristics, may be drawn into, fall into, or be propelled into the offsets and thus a high degree of precision may not be necessary. Furthermore, even if a filament is not fully centered at a midline of an offset, smaller steps and higher accuracy may still result from use of these optional support-structure techniques. Note also that these optional support-structures can provide a smoother surface, which in some cases the techniques may consider sufficiently smooth such that a multi-stage filament smoothing surface is determined to not be needed for a desired surface smoothness.

As noted in part above, contours of the stages (e.g., contour 510 and contour 608) can be planar. In many cases, however, a stage having offsets is applied over a non-planar prior stage, object, or support structure and thus is not planar. A next stage applied over the prior stage having offsets is thus also not planar.

Whether the prior surface (and thus the stage having offset filaments) is planar or otherwise, controller 104 may provide parallel filaments 602 in a plane and the filaments then fall into or are drawn into the offsets. Thus, controller 104 in some cases can provide filaments in each stage without movement in the Y direction, as some non-planar surfaces are still relatively flat, thereby enabling provided filaments to conform even when applied at some distance over the non-planar surface. For example, a non-planar surface that varies from a lowest to highest point of 6 millimeters, can, depending on characteristics of the filaments, be applied at about 6 millimeters from a flat plane. This means that some filaments "fall" or are drawn to the non-planar surface from a distance in the Z dimension of as little as 0.05 millimeters while others are from as much as 6 millimeters.

Further, again whether the prior surface is planar or otherwise, controller 104 may provide parallel filaments 602 at intra-stage levels when filament-providing element 106 is capable of a precision in the Z dimension that is better than a filament width. In other words, parallel filaments 602 can be provided at or near an intended final location of the filaments, and thus at varying distances between contour 510 and contour 608, such as at about small-stepped surface 610 of FIG. 6 or over the example non-planar surface with a consistent application of 0.3 millimeters over a surface varying from a lowest to highest point from zero to five millimeters.

As noted in part above, in some cases the techniques can provide thinner or thicker filaments, such as thinner filaments over smaller offsets and thicker filaments over larger offsets. Application of thinner or thicker filaments can be responsive to sensor data 208 from sensors 112. Assume, for example, that sensors 112 provide a conformity value indicating an amount at which one of parallel filaments 602 of stage 604 conforms to, or "sinks into," one of offsets 508. In response to parallel filaments 602 not sufficiently conforming, or conforming more than expected into offsets 508 provided at stage 504, controller 104 may alter a characteristic of not-yet-applied parallel filaments 602 during provision of stage 604. Note that the techniques may act similarly when applying multi-stage filaments for a smoothing surface in a similar manner, such as to reduce droop, increase flexibility (which often increases droop but can be useful when droop is not a concern), and alter filament width.

Figure 7:
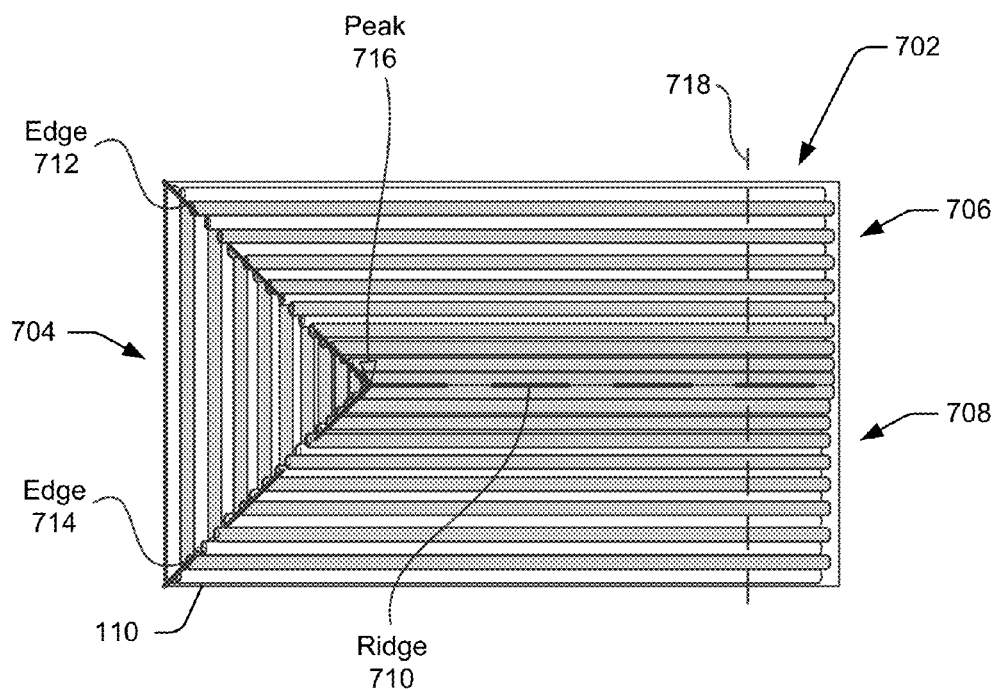
FIG. 7 illustrates a 3D object having a triangular portion and two non-symmetrical polygons with filaments rising to a ridge.
Figure 7:
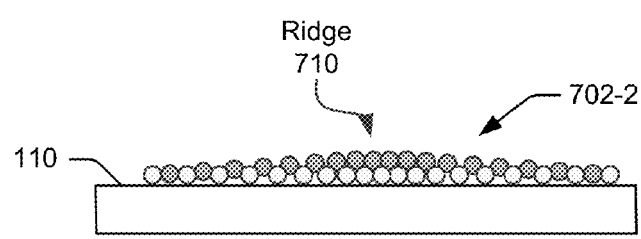

The ongoing example of FIGS. 5 and 6 describe small-stepped surface 610 having a smooth ramp from contour 510 to contour 608. The described techniques, however, can produce arbitrary support structures and their corresponding surfaces using methods 400 and/or methods 800 described below. By way of example, consider a case where a designer wishes to create a 3D object having a high ridge with three portions rising up to the ridge, one being triangular and the others being non-symmetrical polygons. This example is shown in FIG. 7, with 3D object 702 on plate 110, triangular portion 704, first non-symmetrical polygon 706, and second non-symmetrical polygon 708. Note that each of these portions has a first and a second stage of parallel filaments rising to ridge 710. 3D object 702 also includes edges 712 and 714 that rise up to peak 716 of ridge 710. A cross-section view 702-1 across line 718 is also shown in FIG. 7. This is but one example intended to show that the techniques can provide arbitrary structures and surfaces, others are described and contemplated herein. Furthermore, a smoothing surface can be provided over this and similar arbitrary structures and surfaces, which is described later below.

Optional Support Structures Using Non-Parallel Offsets—Third Example

Figure 8:
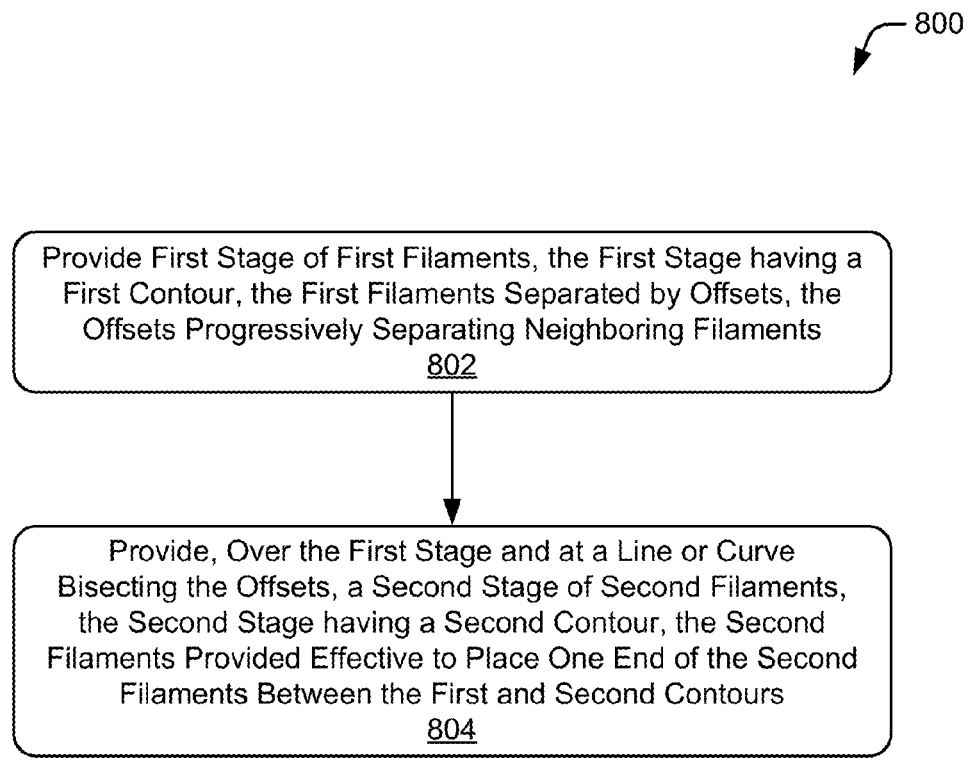
FIG. 8 illustrates an example method for providing support structures including using offset 3D printing with offsets progressively separating non-parallel filaments.

FIG. 8 depicts methods 800 for providing support structures including using offset 3D printing with offsets progressively separating non-parallel filaments.

At 802, a stage of non-parallel filaments is provided. These non-parallel filaments are provided with offsets separating neighboring non-parallel filaments, which can progress to or from a larger separation to a smaller separation. By way of example, consider FIG. 9, which illustrates a stage 902 having two non-parallel filaments 904 with an offset 906 separating these filaments, all provided over plate 110.

At 804, non-parallel filaments of another stage are provided over offsets of the prior stage. These non-parallel filaments can be provided over a line or curve bisecting each of the offsets, though this precision is not necessarily required. This stage, like the prior stage provided at 802, can have various planar or non-planar contours, such as when the prior stage is applied over a non-planar prior stage or object, in which case the prior stage provided at 804 provides non-parallel filaments over the non-planar contour of the previous stage or object.

Whether planar or otherwise, filaments provided at 804 can be provided within that contour (e.g., through filament-providing element 106 when capable of intra-level precision in the Z dimension) or within a plane such that filaments falling into, propelled into, or drawn into, the offsets as noted in detail above.

Figure 9:
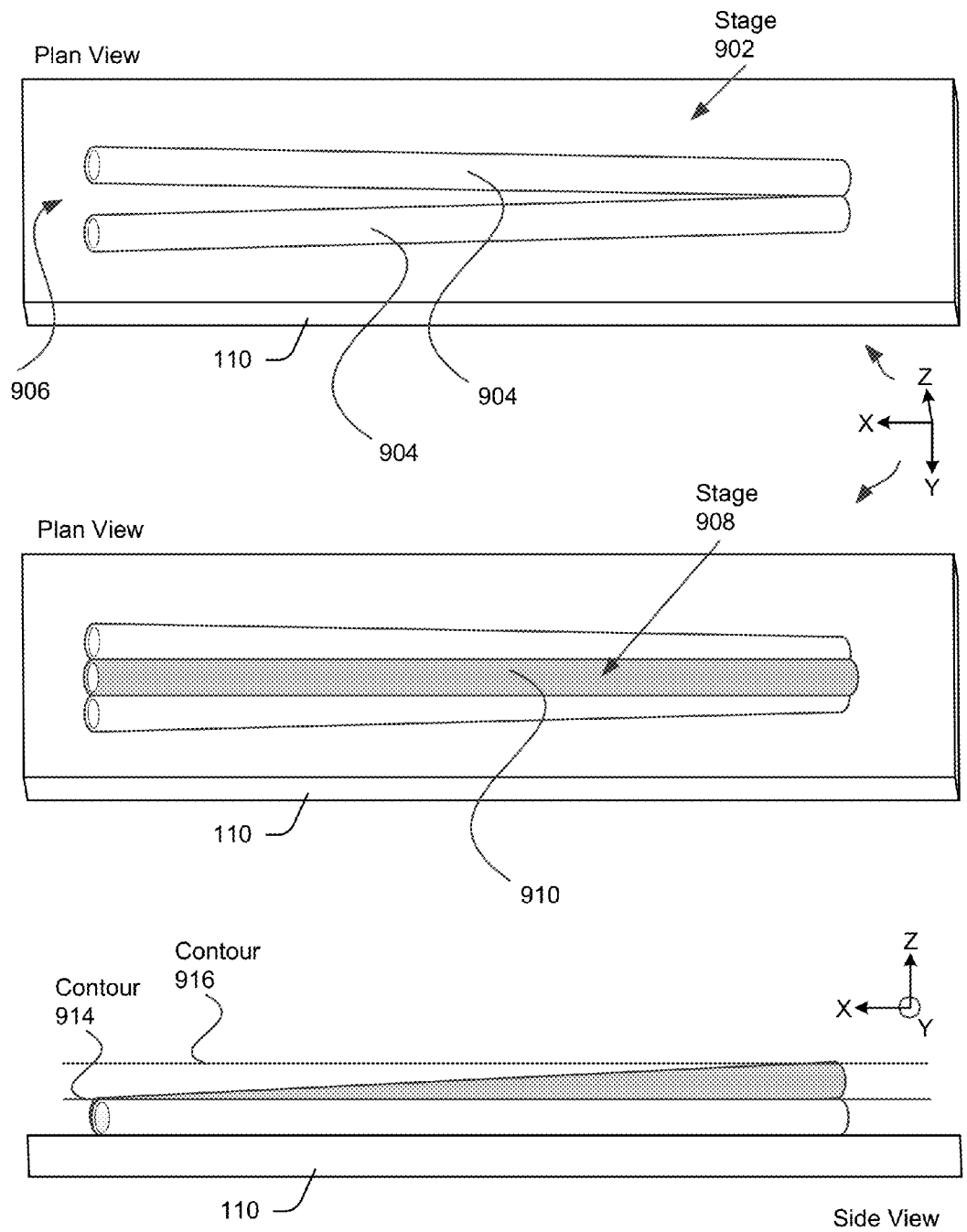
FIG. 9 illustrates a stage having two non-parallel filaments with an offset separating these filaments and another stage with a filament in this offset.

Continuing the ongoing example of FIG. 9, controller 104 provides another stage 908 over stage 902, this other stage 908 having one non-parallel filament 910 (for visual brevity) provided over this offset 906. Offset 906 begins at a width of about that of non-parallel filaments 904 and 910 and ends at a zero width (non-parallel filaments 904 touch at one end). A side view of both stages 902 and 908 is shown to illustrate contour 914 of stage 902 and contour 916 of stage 908. Note that non-parallel filament 910 provides a surface rising gradually and consistently from contour 914 to 916. In this illustrated example, controller 104 provides non-parallel filament 910 in a line bisecting offset 906, though exact precision in bisecting the offset is not required. For additional illustration, consider FIG. 10, which shows six cross-section views 1000 of stages 902 and 908 of FIG. 9. These cross-section views 1000 illustrate the location of non-parallel filament 910 in the Z dimension relative to contour 916.

Figure 10:
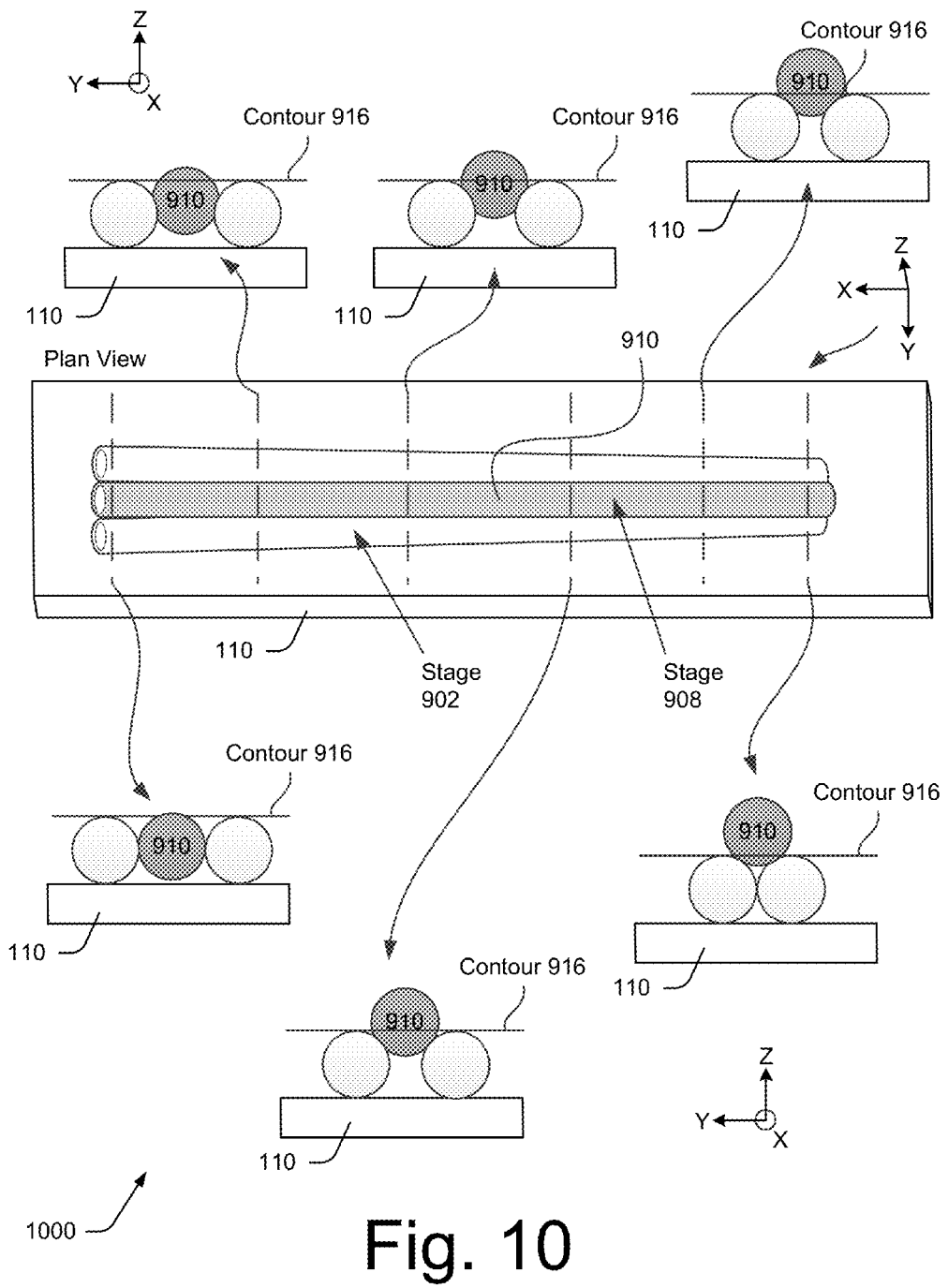
FIG. 10 illustrates cross-section views of the stages of FIG. 9.
Figure 11:
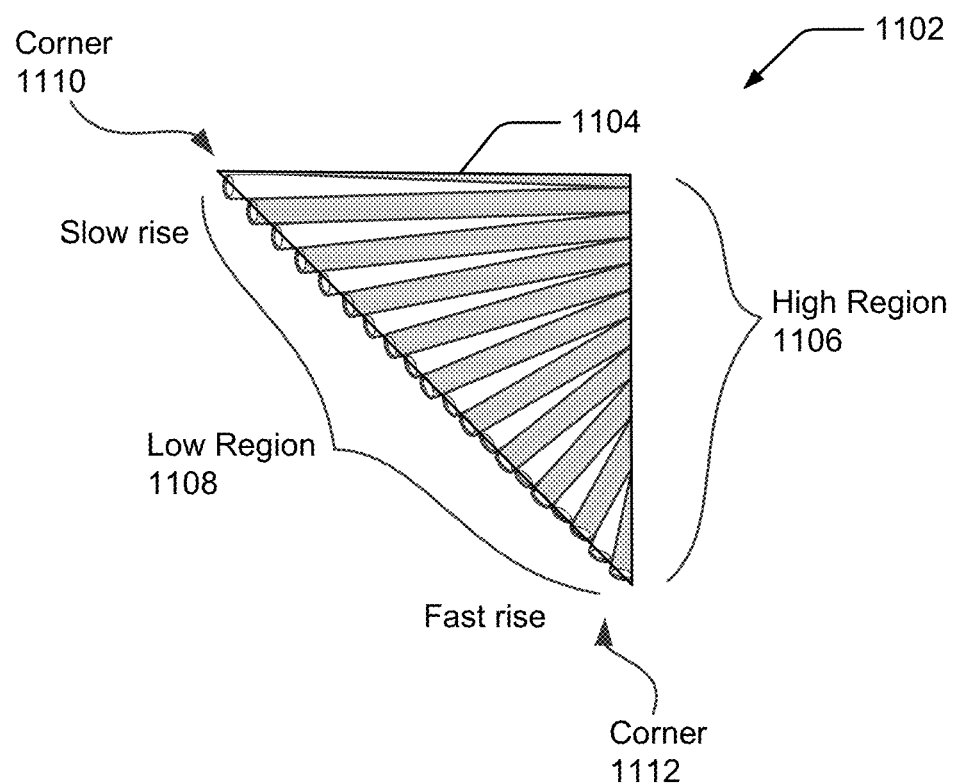
FIG. 11 illustrates a 3D object having a triangular portion with a high region opposite a low region with varying rates of rise.

The example illustrated in FIGS. 9 and 10 show three filaments in two stages for visual brevity. Stages provided by methods 800, however, can be used to build numerous support structures. Consider, for example, FIG. 11, which illustrates a 3D object 1102 having a triangular portion 1104 with a high region 1106 opposite a low region 1108, low region 1108 having corners 1110 and 1112. Note that the rate of rise from corner 1110 of low region 1108 to high region 1106 is slow relative to the rate of rise from corner 1112 of low region 1108 to high region 1106. Thus, the techniques can build a structure having a smooth surface and a varying rate of rise for various portions of the 3D object. Similarly, a 3D object may have a consistent or varying rate of rise to an apex (rather than the linear edge of high region 1106), such as with a fan-shaped portion with a consistent rate of rise to an apex region. The outer edge can be linear, polygon, arced, and so forth. These are but two examples of the many support structures and surfaces optionally enabled by the techniques.

Figure 12:
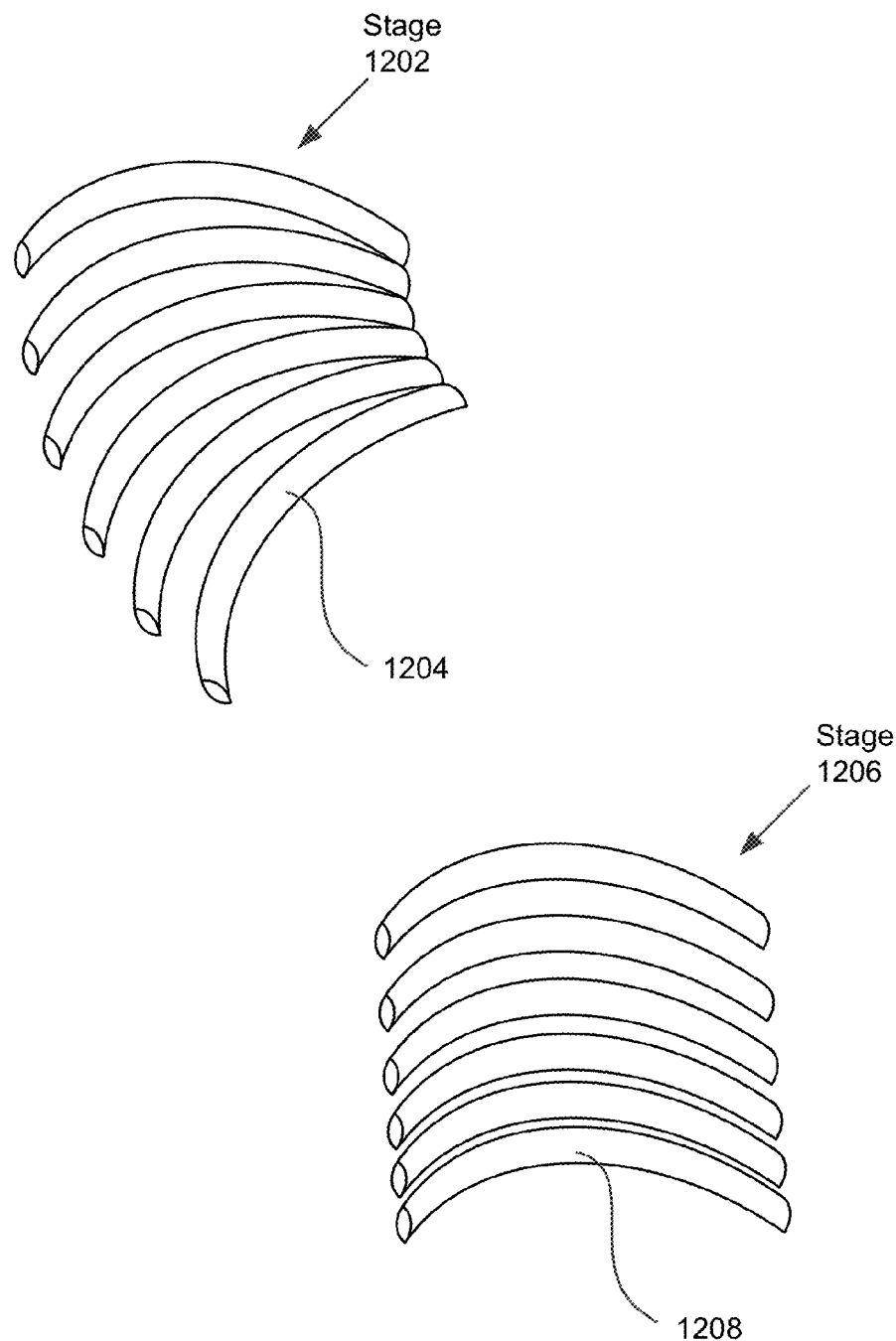
FIG. 12 illustrates a stage of non-parallel non-linear filaments having offsets between neighboring filaments and another stage having parallel non-linear filaments having offsets.

While illustrated above with various linear filaments, methods 400 and 800 may provide filaments that are non-linear. Consider, for example, FIG. 12, which illustrates a stage 1202 having non-parallel non-linear filaments 1204 having offsets between neighboring of the non-parallel non-linear filaments 1204. FIG. 12 also illustrates a stage 1206 having parallel non-linear filaments 1208 with each offset having a non-varying size—each offset, however, may have a different width than each other offset. As can be imagined from these stages, many non-planar and non-linear surfaces and structures are enabled by the techniques. Consider, for example, a case where a designer wishes to build an object having a point rising from an arbitrary, elliptical, or circular foundation. The techniques enable such a structure, including through use of non-linear filaments having offsets.

Consider also a case where a designer wishes to build an object having many non-planar surfaces. One of these surfaces is illustrated in cross-section in FIG. 13, which shows a concave, non-planar surface 1302 between two planar contours 1304 and 1306. Planar contour 1304 is applied in stage 1308 over plate 110 with offsets spaced sufficient to create, when stage 1310 applies filaments over stage 1308, to create concave, non-planar surface 1302. This concave, non-planar surface 1302 illustrates one of many surfaces enabled by the techniques, such as surfaces that are irregular, non-planar, convex, concave, and so forth.

Figure 13:
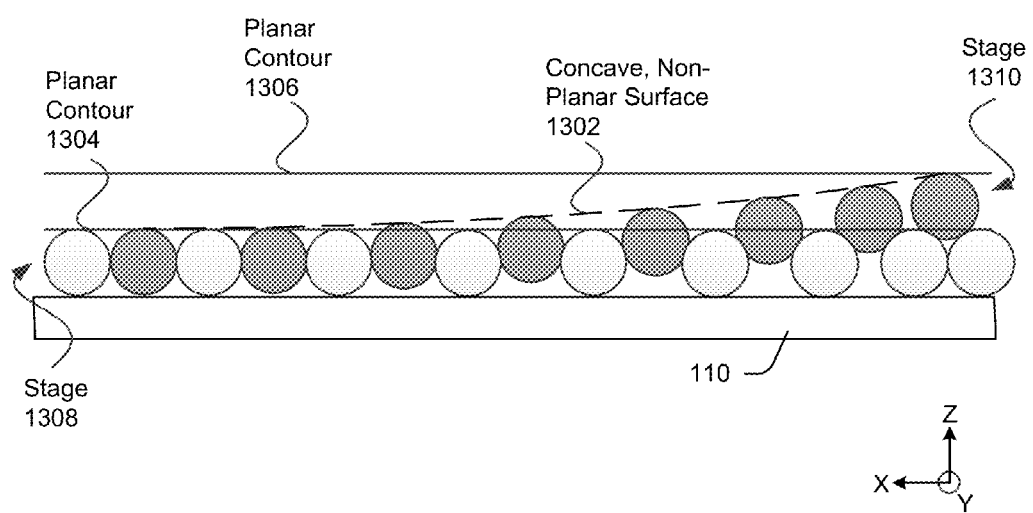
FIG. 13 illustrates two stages having planar contours where the techniques create a concave, non-planar surface between the two planar contours.

While simplified in FIG. 13 for visual clarity, a surface of a support structure can be created rising to a point, ridge, or otherwise, and from an arbitrary, elliptical, or circular foundation. The techniques optionally enable such a structure, including through use of non-linear filaments having offsets.

Techniques for Smooth 3D Printing Using Multi-Stage Filaments

As noted above, the techniques enable smooth 3D printing using multi-stage filaments. The following methods are described in part using entities and examples of FIGS. 1-13, though this is for example only. The techniques, for example, may forgo use of support structures and particular filament sizes, cross-sections, and droop distances.

Figure 14:
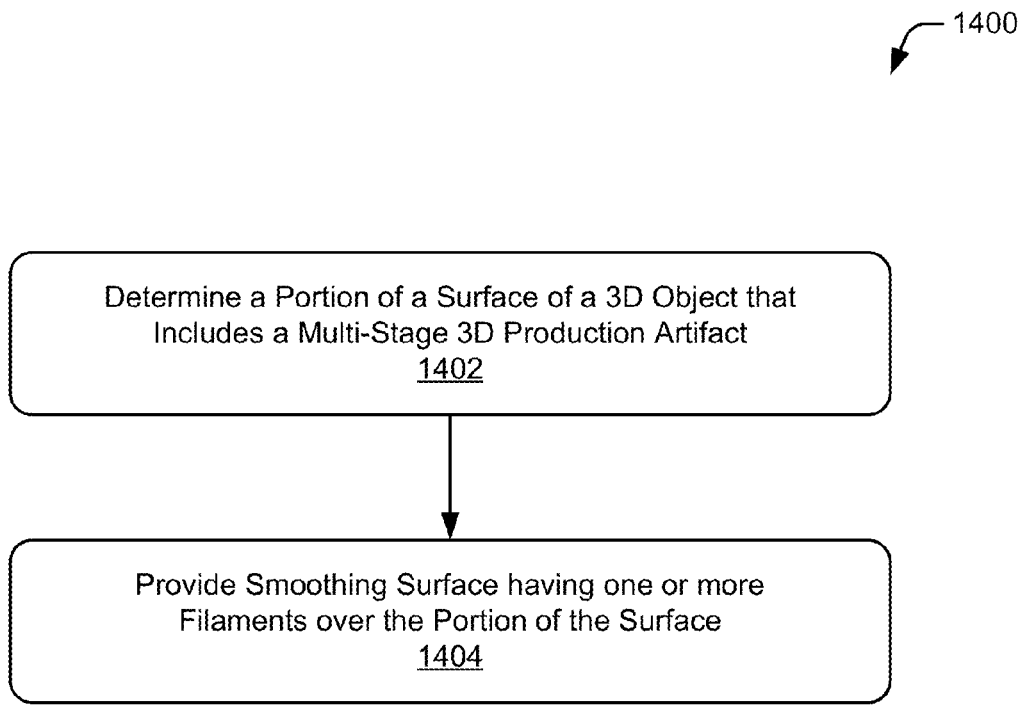
FIG. 14 illustrates example methods that enable smooth 3D printing using multi-stage filaments.

FIG. 14 illustrates example methods 1400 that enable smooth 3D printing using multi-stage filaments. At 1402, a portion of a surface of a three-dimensional (3D) object that includes a multi-stage 3D production artifact or some other undesired surface characteristic is determined. Production artifacts, as noted above, are common and include steps, unintentional edges, and other non-smooth and visually unappealing artifacts.

Note that some undesired surface characteristics are common to 3D printing, such as imperfections at a beginning and an end of a filament. These imperfections can be made more common and unsightly when the printing includes many short filaments, thereby increasing the number and fraction of a surface having these imperfections. In cases where a support structure is built that includes numerous short filaments, for example, the techniques can provide a smoothing surface over these imperfections while at the same time using the support structure to create a smoother final surface or stronger structure of a 3D object. In this one optional manner, the techniques combine support structures that provide support and, in many cases, a stronger and more durable end product, while correcting imperfections of short filaments present in the support structure.

Furthermore, some undesired surface characteristics have flaws that are more than a filament-width in multiple dimensions, such as all of the X, Y, and Z dimensions illustrated in the various figures. These flaws are difficult or impossible for current techniques to address, in part because of their multi-filament-width dimensions. Many 3D printing techniques, for example, cannot apply filaments across or between filament widths, instead applying filaments in set stages. Each of these stages is therefore one filament in width, as are many of the flaws, such as step-type flaws noted above. The techniques may correct such flaws before production based on modeling, or after production as a corrective measure.

Figure 3:
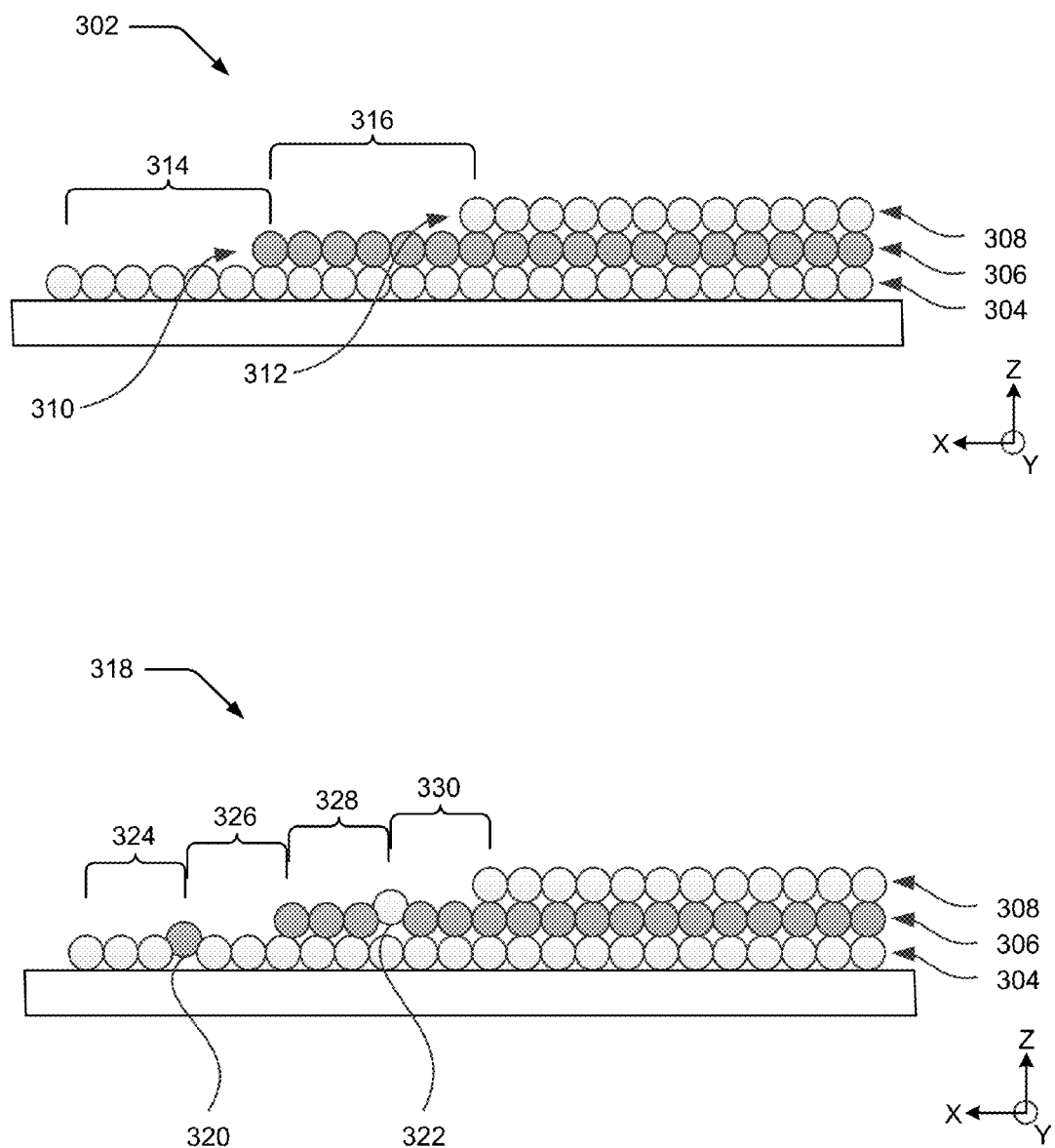
FIG. 3 illustrates a computer model of a 3D object, shown in cross-section and having multiple stages and two production artifacts.

Controller 104 may determine portions having artifacts or other undesirable surfaces from those that are already created, such as using sensors 112 and sensor data 208 of FIGS. 1 and 2, respectively. In some cases, however, this determination is performed prior to printing the 3D object and is instead based on a model approximating the 3D object. This is described in detail in FIG. 17 as part of methods 1700. When determined using a model, in some cases controller 104 alters prior stages so that, when applying multi-stage filaments to create a smoothing surface, some prior stages are altered or not included. An example of an altered modeled surface is shown in FIG. 3. 3D object 318 is altered such that stages 304, 306, and 308 include two additional support structures 320 and 322 over which to apply a smoothing surface. Prior stages may also not be included so that the final object has the correct dimensions. In some cases both are performed.

Figure 15:
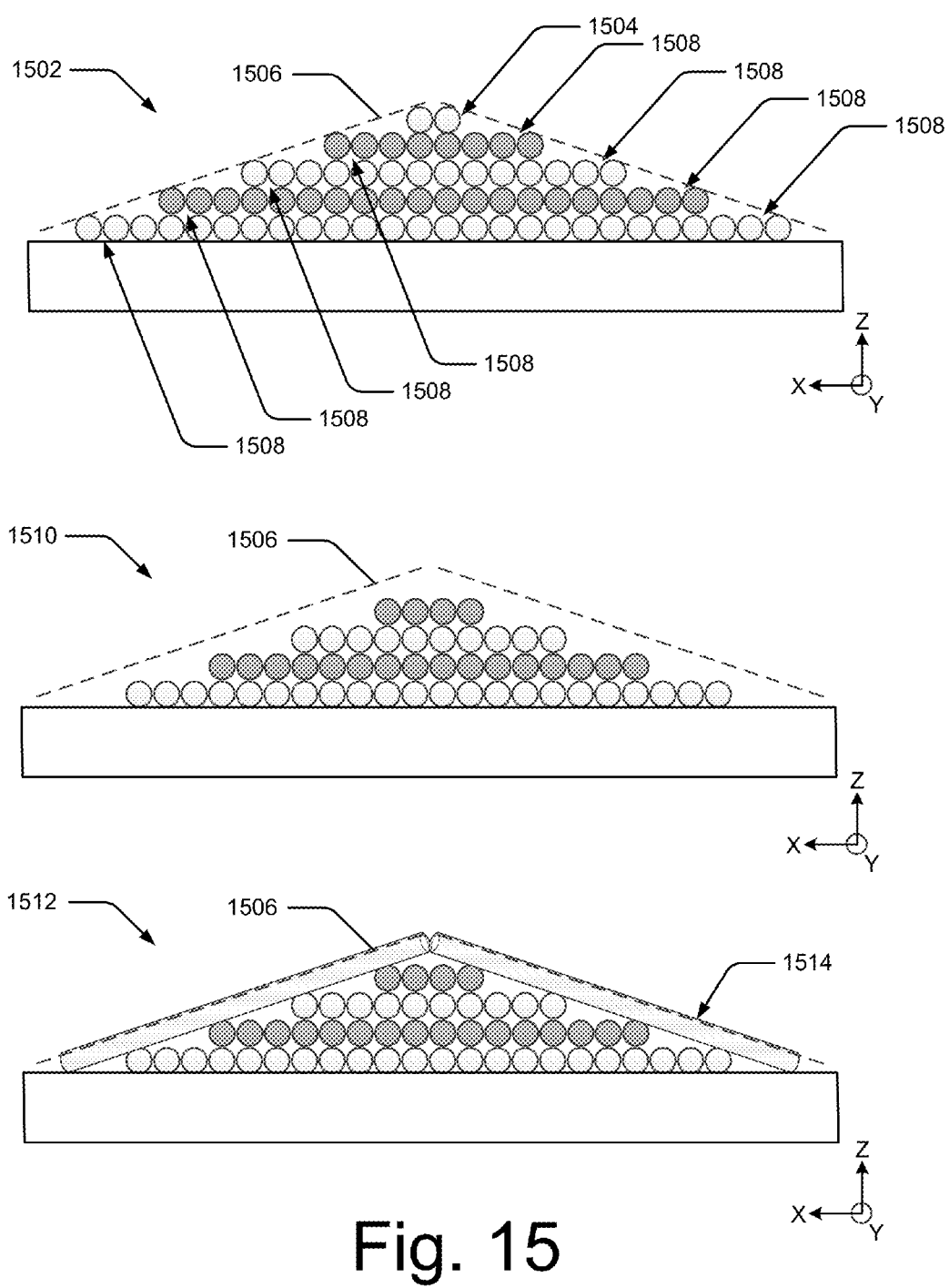
FIG. 15 illustrates stages of a modeled object having a final stage and a desired smooth surface having two planes coming to a ridge.

Consider, by way of example, FIG. 15, which illustrates stages of a modeled object 1502 having a final stage 1504 and a desired smooth surface 1506 having two planes coming to a ridge. Modeled object 1502 also includes outer filaments 1508.

Rather than use modeled object 1502, the techniques determine, at 1402, to forgo final stage 1504 and forgo application of the outer filaments 1508. This is shown at preliminary modeled object 1510. Thus, preliminary modeled object 1510 is instead modeled (and created) without final stage 1504 and with outer filaments 1508 removed from the three prior stages. As shown in FIG. 3, these alterations may also include support structures (e.g., additional support structures 320 and 322).

Returning to methods 1400, the determination at 1402 can be based in part on a filament head intended to apply the one or more filaments of the smoothing surface and a multi-stage contour over which the one or more filaments is intended, such as in cases where a filament head is large enough that it will contact the contour over which the filaments are to be applied.

This determination at 1402 also involves determining support-to-support distances and how it may affect a produced smoothing surface. An example of this is illustrated in FIG. 3, which shows support-to-support distances over which multi-stage filaments may be applied. When controller 104 determines that the multi-stage 3D production artifact includes support-to-support distances that are greater than a maximum droop distance for the filament, controller 104 may address this support-to-support distance in various manners.

In the first, controller 104 does not do anything—in some cases a slight or even moderate drooping of the multi-stage filaments still results in a smooth surface that is physically or even visually superior to the artifact over which the smoothing surface is applied. Thus, a filament that has a maximum droop distance of three filament-widths can be applied over any support-to-support distances of five filaments with generally good effect.

In the second, controller 104 increases the maximum droop distance of the filaments by increasing a viscosity of a filament material (e.g., by applying the filaments at a lower temperature) or a thickness of the filaments, such as by extruding the filament at a lower speed.

In the third, controller 104 provides additional supports, prior to providing the smoothing surface, between current supports having the support-to-support distances that are greater than the maximum droop distance. This is effective to reduce the support-to-support distance to less than or equal to the maximum droop distance or at least to a support-to-support distance that is nearer the maximum droop distance thereby reducing the droop of the multi-stage filaments.

Figure 16:
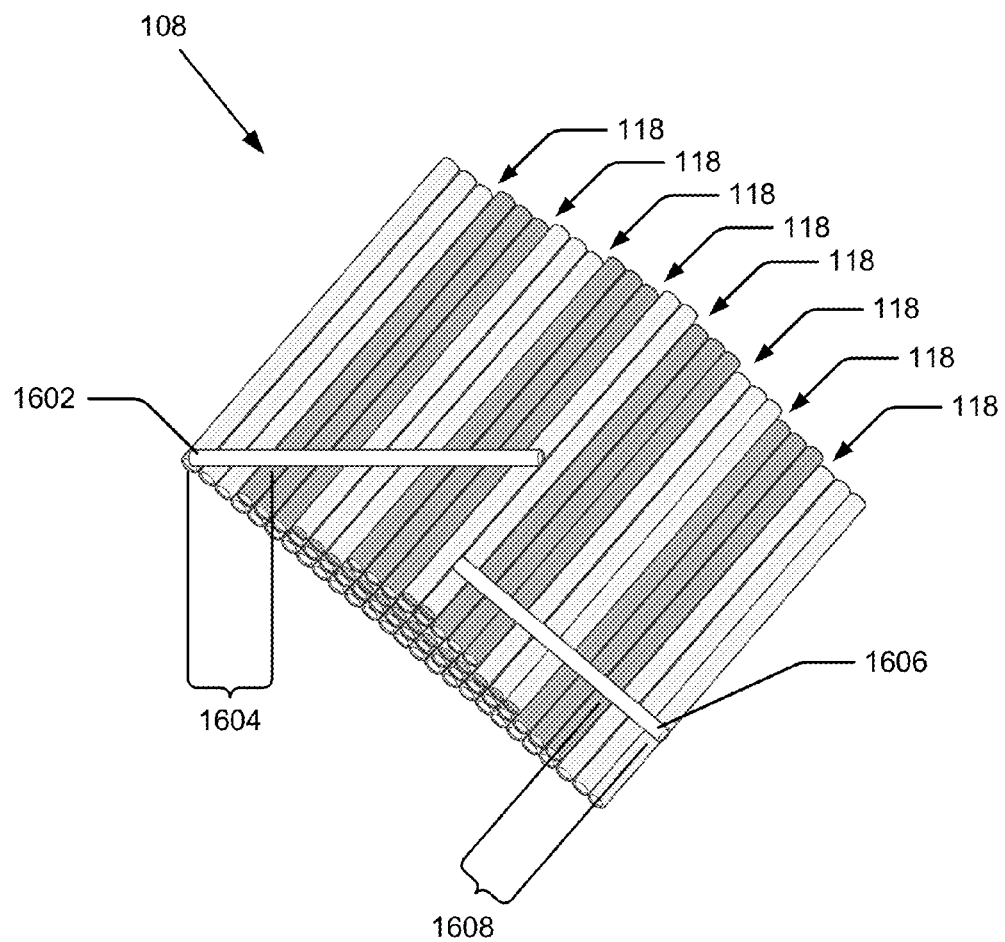
FIG. 16 illustrates the 3D object of FIG. 1 and application of a multi-stage filament at 45 degrees and 90 degrees relative to steps on the 3D object.
Figure 16:
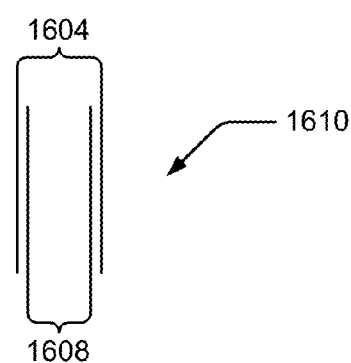

In the fourth, controller 104 may alter a planned application angle of the filaments to reduce the support-to-support distance. If a planned application of the filaments over the prior stage is at 45 degrees, for example, the support-to-support distance is higher than a perpendicular application. Consider, for example, FIG. 16, which illustrates 3D object 108 of FIG. 1 and application of a multi-stage filament 1602 at 45 degrees relative to steps 118 and having a support-to-support distance 1604. Contrast with multi-stage filament 1606 applied at 90 degrees (perpendicular) to steps 118 and having a support-to-support distance 1608. These distances are compared visually at 1610. These manners can be used separately or in combinations.

At 1404, a smoothing surface having one more filaments is provided over the portion of the surface, at least one of the one or more filaments provided over two or more stages of the multi-stage 3D production artifact.

Continuing the example illustrates in FIG. 15, the techniques, at 1404, proceed to apply multi-stage filaments over the surface of an object created using preliminary modeled object 1510 resulting in a final object 1512, which includes a smoothing surface 1514. Note that smoothing surface 1514 closely matches desired smooth surface 1506.

The techniques, at 1404, may apply one or more filaments, including multi-stage filaments. Application of these one or more filaments can be substantially perpendicular to previously applied filaments of the multi-stage 3D production artifact of the portion of the surface, or a single filament is continuously applied over the portion of the surface, provided parallel to each other. Examples of this are provided as part of methods 1700 below.

Figure 17:
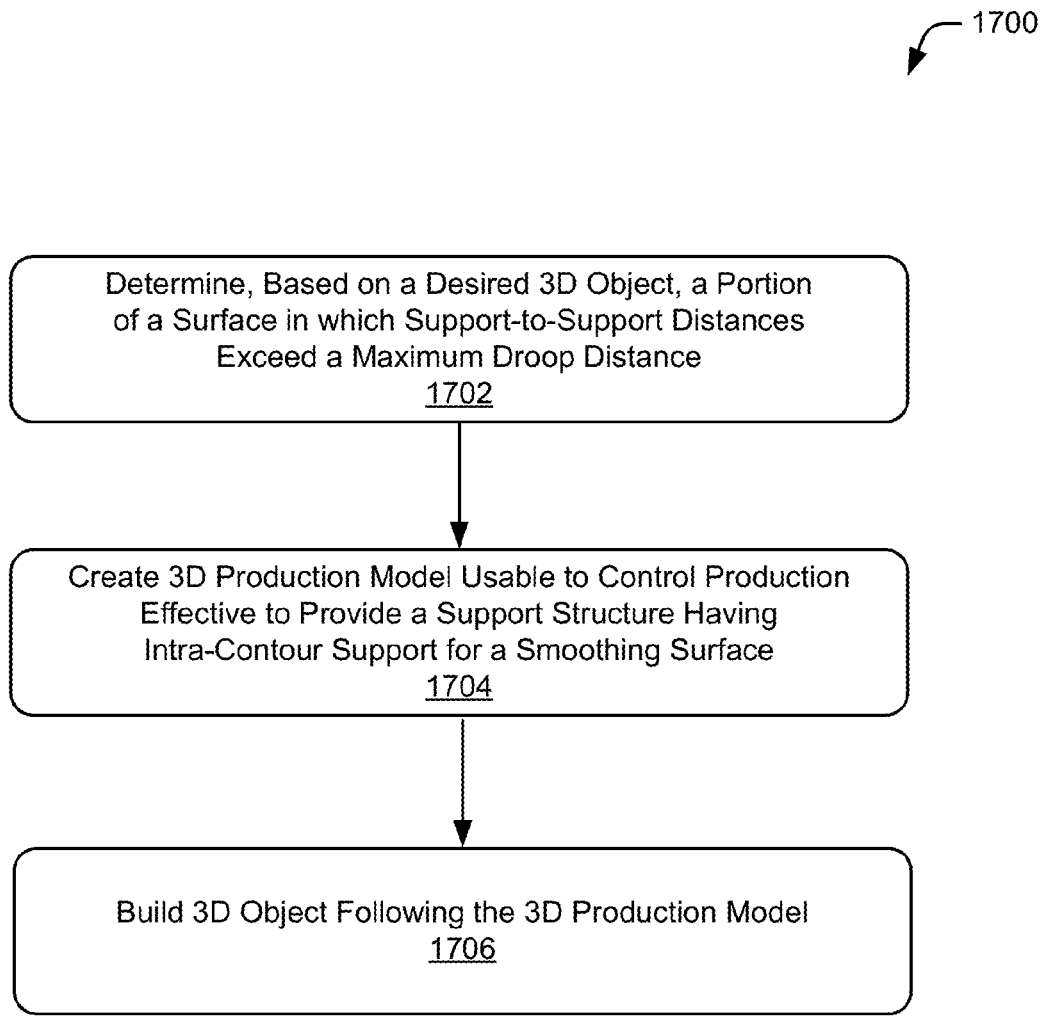
FIG. 17 illustrates example methods that enable smooth 3D printing by building a 3D production model usable to control a filament-providing element.

FIG. 17 illustrates example methods 1700, which enable smooth 3D printing using multi-stage filaments by building a 3D production model usable to control a filament-providing element.

At 1702, a portion of a surface in which support-to-support distances exceed a maximum droop distance of a multi-stage filament is determined. Controller 104 may determine this based on a desired three-dimensional (3D) object intended to be created using 3D printing. Note that this surface can be a final or intermediate surface; in some cases, for example, internal surfaces are desired to be smooth, such as for greater strength, reduced friction of moving parts, greater thermal insulation or conductivity (depending on the filament characteristics), or lower gas or liquid permeability.

At 1704, a 3D production model usable to control a filament-providing element is created. This 3D production model can be used to control production of a 3D object through one or more stages. For example, the 3D model can enable production of a prior stage (the prior stage for the portion of the surface in which support-to-support distances exceed the maximum droop distance determined at 1702). This prior stage can be produced to include a support structure having intra-contour support for the smoothing surface, the intra-contour support decreasing the support-to-support distances to less than, equal to, or nearer to the maximum droop distance. Example intra-contour supports include additional support structures 320 and 322 of FIG. 3, small-stepped surface 610 of FIG. 6 (and thus parallel filaments 602), various filaments shown in FIG. 7, non-parallel filament 910 (note that non-parallel filament 910 is intra-contour of contour 916, which is shown also in cross-section in FIG. 10), filaments of the second stage of FIG. 11, all but the first filament of stage 1310 of FIG. 13 of concave, non-planar surface 1302. In each of these examples, a support is provided between contours, which provides support in part to reduce support-to-support distances. This model can also enable production of a later stage of production that includes a smoothing surface applied over the support structure having the intra-contour support.

Note that this determination and creation of 1702 and 1704 can be made based on a desired 3D object or a model designed to create the desired 3D object, including stages or other production procedures of the model. In such a case, the 3D production model can represent a new or an altered version of the prior model.

Figure 18:
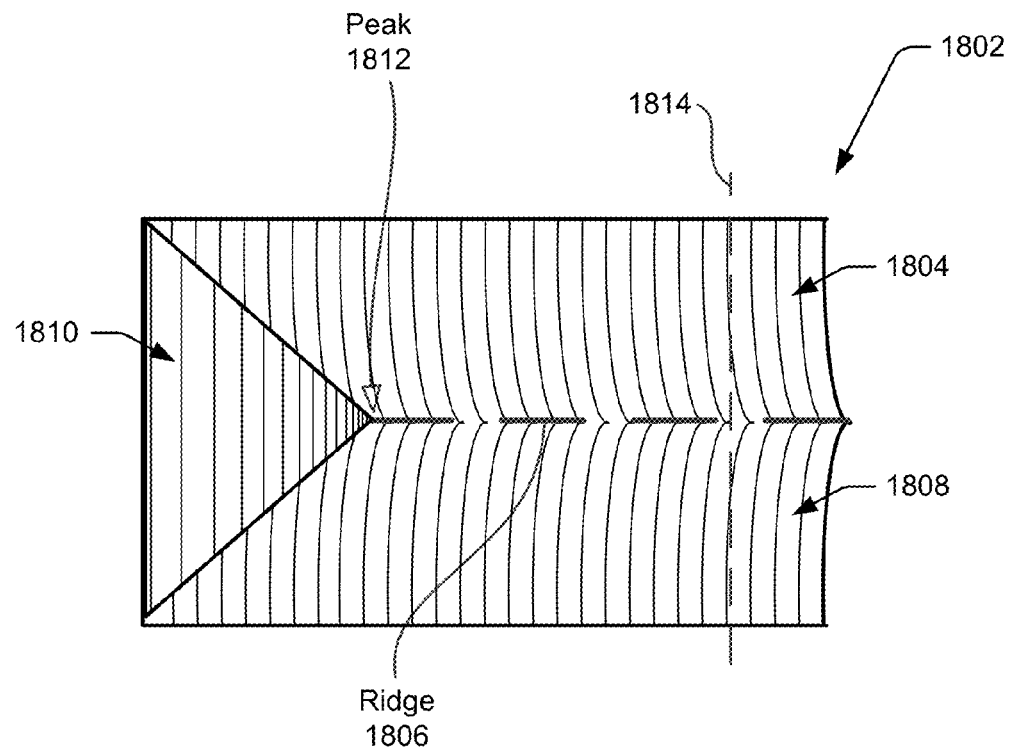
FIG. 18 illustrates a desired 3D object having a desired feature, the desired feature having three surface parts.
Figure 18:
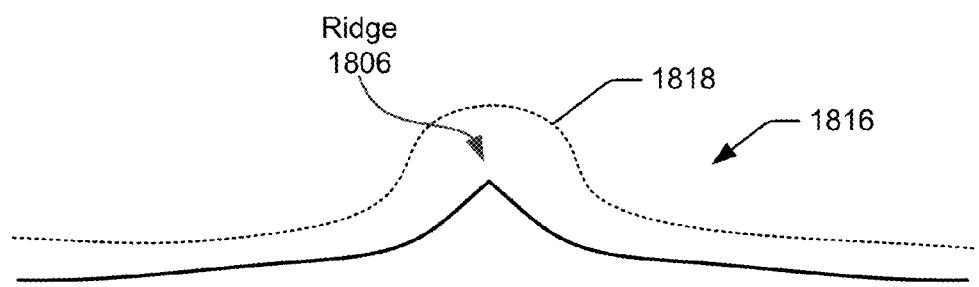

By way of example, consider a desired 3D object having a desired feature 1802 as illustrated in FIG. 18. Note that desired feature 1802 has a desired surface with three parts, a first surface part 1804 rising to a ridge 1806, a second surface part 1808 also rising to ridge 1806, and a third surface part 1810 rising to peak 1812 at an end of ridge 1806. First and second surface parts 1804 and 1808 include concave smooth surfaces rising to a sharp edge at ridge 1806. These concave smooth surfaces are shown magnified and in cross-section along line 1814 at concave surfaces 1816. Third surface part 1810 includes a smooth, planar triangular shape rising to peak 1812.

Figure 19:
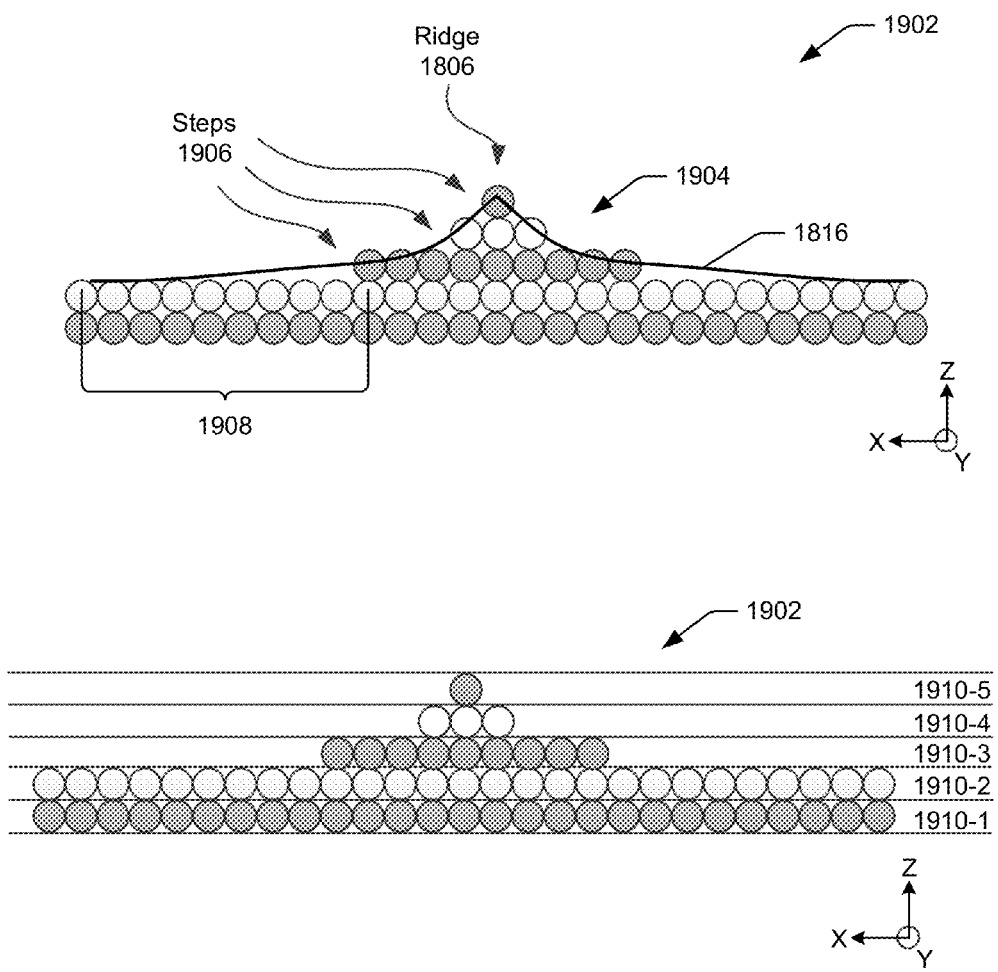
FIG. 19 illustrates the desired 3D object of FIG. 18 with a preliminary model usable to create an object without techniques for smooth 3D printing using multi-stage filaments. This preliminary model shows multi-stage artifacts having steps.

Based on this desired 3D object, a preliminary model 1902, illustrated in FIG. 19, can be created that uses 3D printing without techniques for smooth 3D printing using multi-stage filaments. Shown in cross-section, note multi-stage artifacts 1904 and steps 1906, as well as a support-to-support droop distance 1908 of eight filament-widths, which here is assumed to be greater than a maximum droop distance of two filament-widths. In this case a two filament-width maximum droop distance is used due to a desired flexibility of the filament of the smoothing surface. This flexibility aids in making the smoothing surface closely follow desired surfaces 1816 at ridge 1806. Because ridge 1806 has a high rate of rise, a filament that is fairly stiff will make the smoothing surface at the ridge obtuse or bulbous, and therefore not closely follow ridge 1806.

Note that if a filament head is large enough to contact a prior stage at ridge 1806, one manner in which to address this issue is to move the filament head further from ridge 1806 as the filament head is getting near to ridge 1806. This is shown at filament-head path 1818, which follows closely with desired surface 1816 except at ridge 1806.

The techniques then create a 3D production model usable to control production either from scratch or based on preliminary model 1902. Here assume that preliminary model 1902 is altered and that controller 104 determines to create a support structure and otherwise alter the preliminary stages of preliminary model 1902. These unaltered preliminary stages are shown in FIG. 19 at stages 1910-1, 1910-2, 1910-3, 1910-4, and 1910-5, each of which represents an applied layer of filaments.

Figure 20:
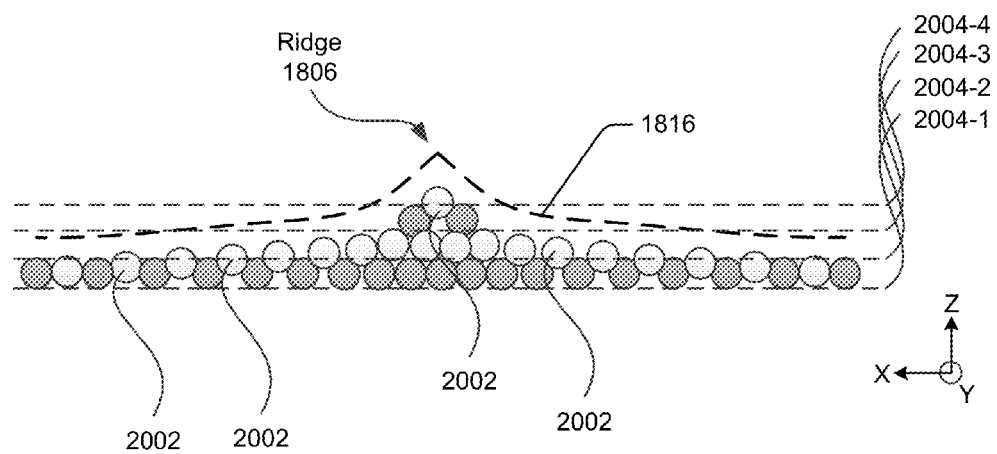
FIG. 20 illustrates a cross-section of support structures residing between two contours.
Figure 20:
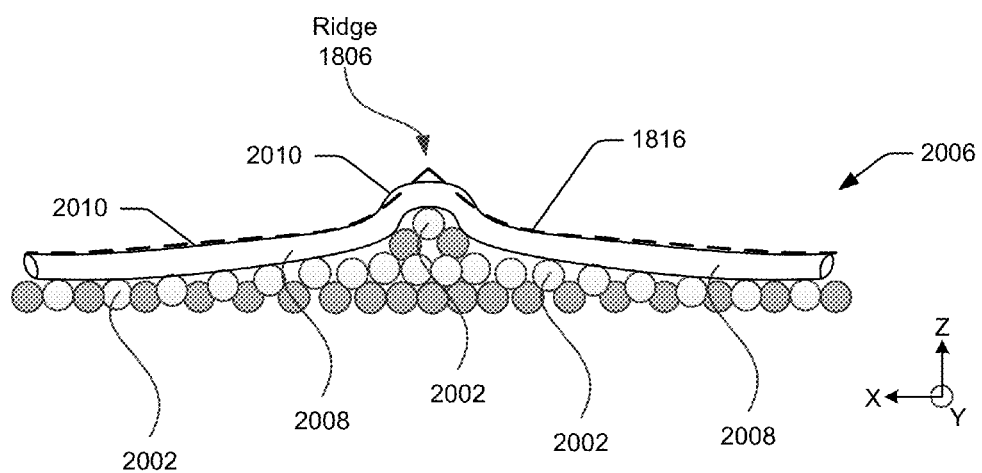

As noted, controller 104 creates a 3D production model having intra-contour support for a smoothing surface. FIG. 20 illustrates a cross-section of many support structures 2002 having at least a top, or support-providing portion, of the filaments of which reside between two of contours 2004-1, 2004-2, 2004-3, or 2004-4. Surfaces 1816 (shown in dashed line) and ridge 1806 are provided for context. Note also that stage 1910-5 of FIG. 19 is not performed to allow for the thickness of multi-stage filaments of a smoothing surface to not alter final dimensions of the desired 3D object. Ways in which the 3D production model enables production of support structures 2002 are noted above, these particular support structures 2002 are built using parallel filaments as described in FIGS. 4-7.

Returning to methods 1700, at 1706 a 3D object is built following the created 3D production model. Continuing the ongoing example, controller 104 builds a 3D object 2006 following the 3D production model described above. This is illustrated in cross-section in FIG. 20, with support structures 2002 and multi-stage filament 2008 making up part of smoothing surface 2010.

Figure 21:
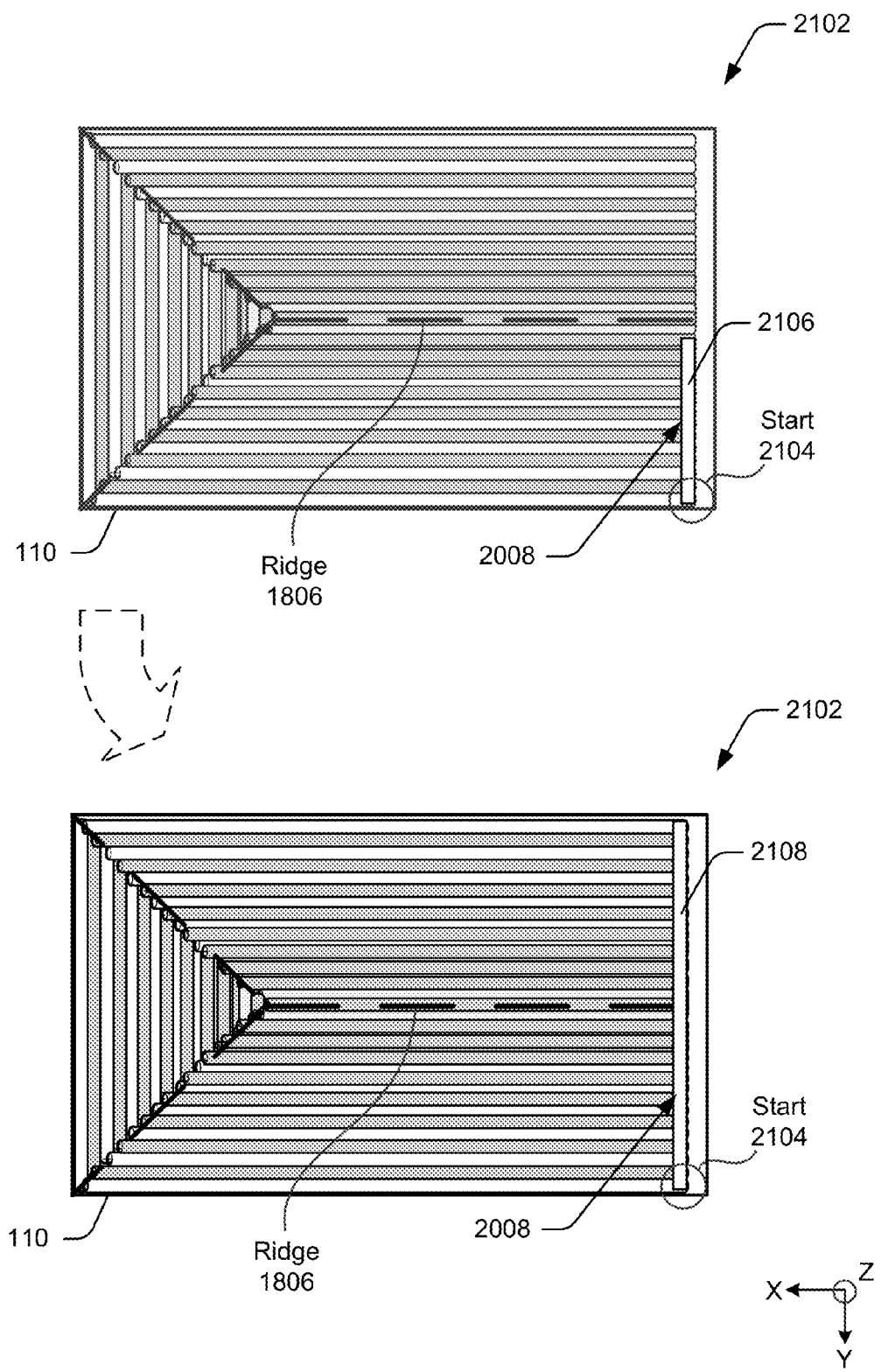
FIG. 21 illustrates a pre-smoothing-surface object shown in a plan view with a portion of a multi-stage filament applied.

Consider also FIG. 21, which illustrates a pre-smoothing-surface object 2102, shown in a plan view, over plate 110. After production of pre-smoothing surface object 2102, controller 104 applies multi-stage filament 2008 to provide smoothing surface 2010. Note that multi-stage filament 2008 is applied over four stages, rising up to ridge 1806 and back down again, along surface 1816 (shown in FIGS. 18-20). In this example, multi-stage filament 2008 is a single filament continuously applied over pre-smoothing surface object 2102. This continuous application is show with multi-stage filament starting at start point 2104, rising up to ridge 1806, with partial filament 2106. Then, at partial filament 2108, applied up four stages over ridge 1806 and then down four stages from ridge 1806. Then, in FIG. 22, multi-stage filament 2008 is shown at partial filament 2202 turning 90 degrees at turn 2204 to provide a short section 2206, then turning 90 degrees again to cut back up toward ridge 1806.

Figure 22:
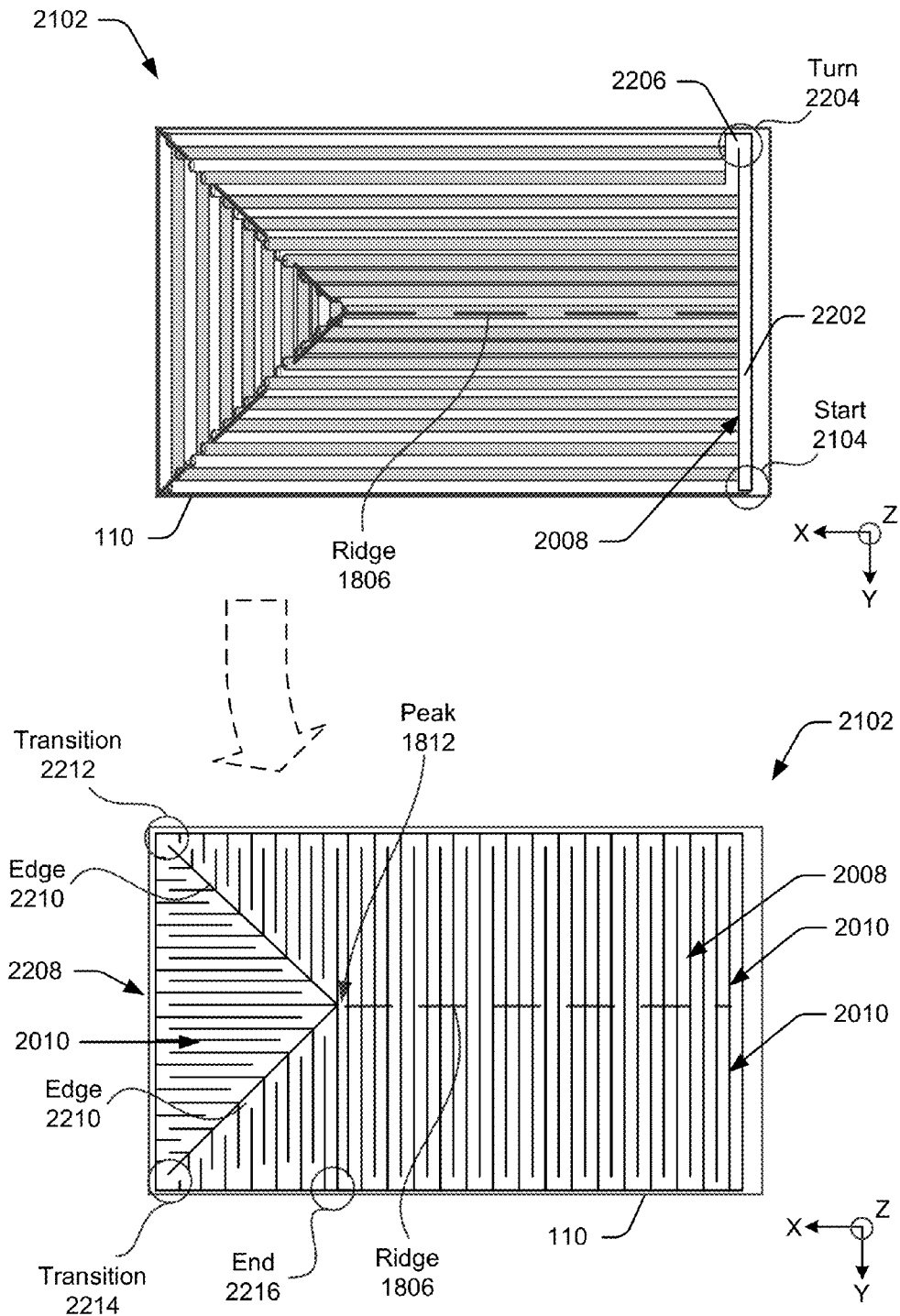
FIG. 22 illustrates a multi-stage filament applied over the pre-smoothing-surface object of FIG. 21 effective to provide a smoothing surface.

FIG. 22 also illustrates multi-stage filament 2008, after having been applied over pre-surface-smoothing object 2102 effective to provide smoothing surface 2010 (shown in FIGS. 20 and 22). Note that in this example, multi-stage filament 2008 is a single filament that is effective to provide two smooth, concave surfaces and a triangular, planar smooth surface 2208 between edges 2210 and rising to peak 1812. The techniques maintain the continuity of multi-stage filament 2008 by transitioning between these surfaces, these transitions shown at 2212 and 2214. Multi-stage filament 2008 ends at end 2216. By applying few (or a single) continuous filament(s) to provide a smoothing surface, imperfections common to a beginning and end of a filament are minimized.

As noted, multi-stage filaments can be provided that are substantially non-parallel or parallel, such as many parallel filaments that may or may not connect at opposing ends. Thus, rather than a single continuous filament having turns and short segments, multiple multi-stage filaments may instead be used.

Figure 23:
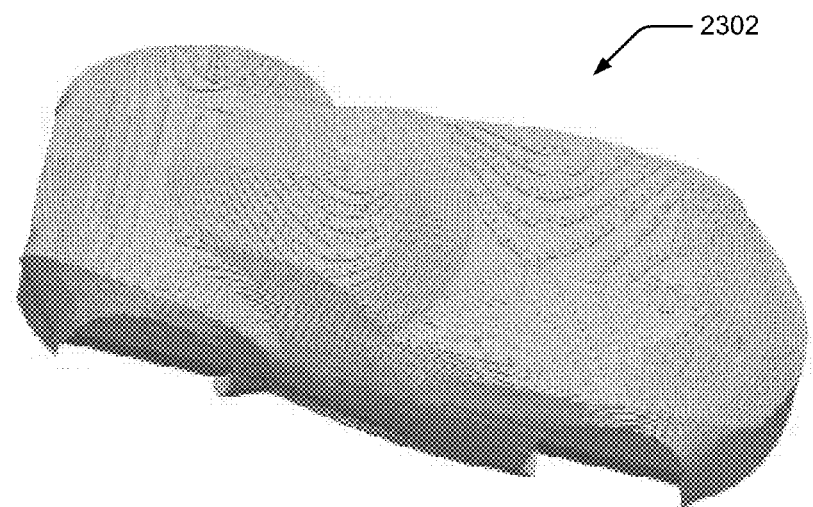
FIG. 23 illustrates a car body created using the techniques.
Figure 23:
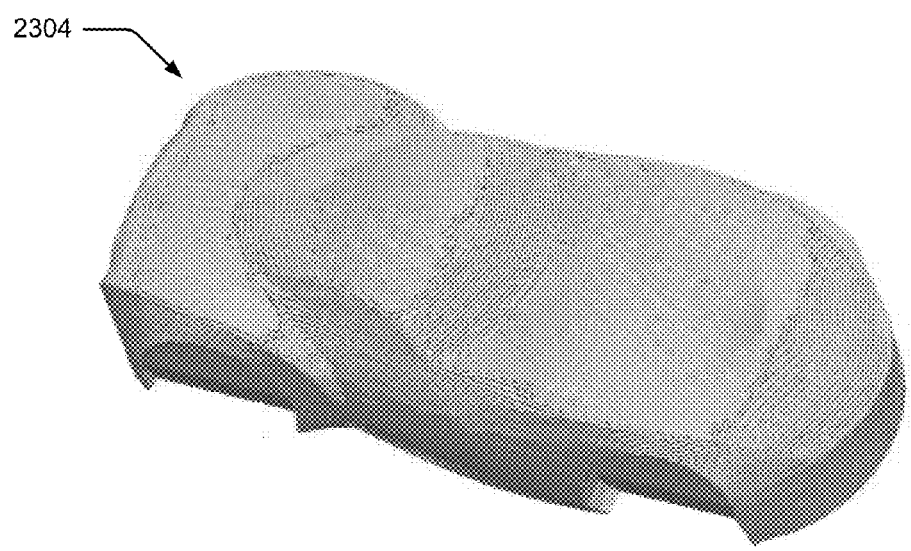

As a final example of the smooth 3D printing using multi-stage filaments, consider FIG. 23, which illustrates a non-smoothing-surface model 2302 of a car body. This non-smoothing-surface model 2302 is superior in many respects from conventional manners of building 3D objects. Non-smoothing-surface model 2302 is built of a combination of non-linear filaments and linear filaments to provide intra-contour support structures, both in parallel and not in parallel. In so doing, planar and non-planar surfaces are created both between stages and through application of multiple stages of filaments. Note, however, that portions of the surface of this non-smoothing-surface model 2302 include various multi-stage 3D production artifacts, though these artifacts are not as severe as many conventional artifacts having full-steps and full-filament-width surface flaws.

The techniques then provide a model enabling, and/or build a 3D object, that provides a smoothing surface over portions of the surface of non-smoothing-surface model 2302, thereby correcting these artifacts. Post-smoothing-surface model 2304 of the same car body is shown with highly smooth surfaces over portions of the surface of non-smoothing-surface model 2302, thereby providing a smooth 3D object printed using multi-stage filaments.

For visual simplicity, the above illustrations show filaments as long strings or columns with circular cross sections. These filaments, however, may have other structures, or be softened, or be subject to later processing thereby altering their structure (e.g., sintering ceramic filaments to improve strength). Whether idealized as long columns with circular cross sections or otherwise, the techniques are capable of building 3D objects with smooth surfaces and accurate structures.

System-on-Chip

Figure 24:
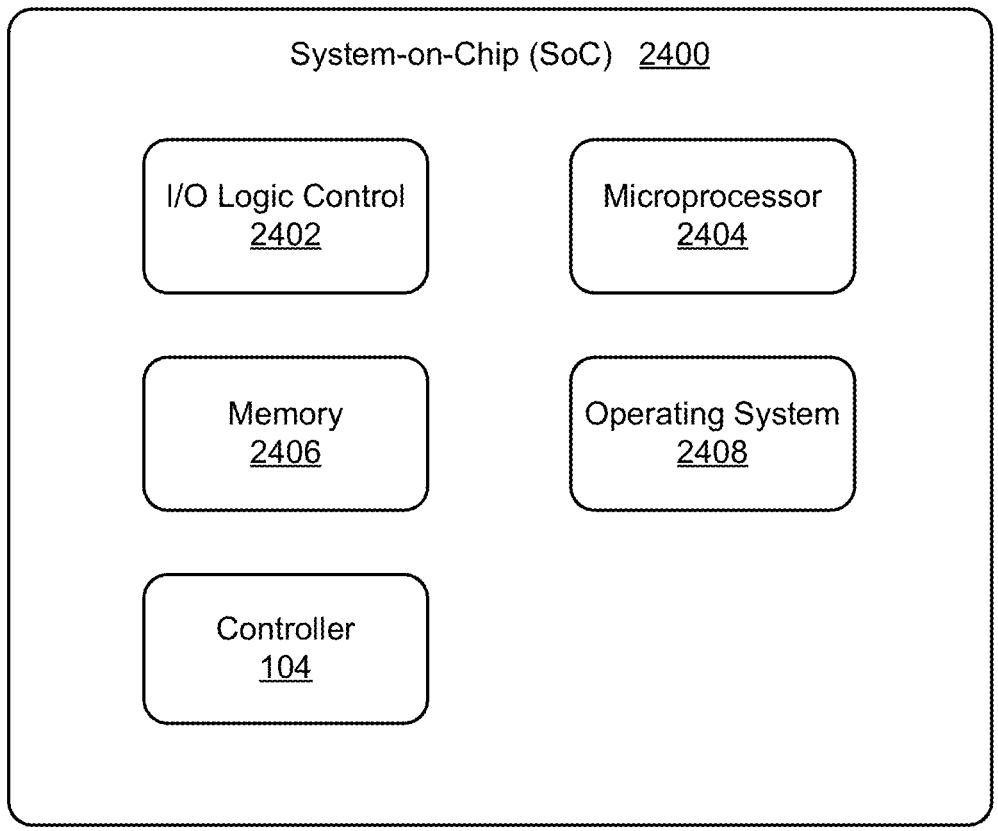
FIG. 24 illustrates a System-on-Chip (SoC) environment for implementing embodiments of the techniques described herein.

FIG. 24 illustrates a System-on-Chip (SoC) 2400, which can implement various embodiments described above. An SoC can be implemented in a fixed or mobile device of various types. SoC 2400 can be integrated with electronic circuitry, a microprocessor, memory, input-output (I/O) logic control, communication interfaces and components, other hardware, firmware, and/or software needed to run an entire device (e.g., 3D printing device 102). SoC 2400 can also include an integrated data bus (not shown) that couples the various components of the SoC for data communication between the components. A device that includes SoC 2400 can also be implemented with many combinations of differing components.

In this example, SoC 2400 includes various components such as an input-output (I/O) logic control 2402 (e.g., to include electronic circuitry) and a microprocessor 2404 (e.g., any of a microcontroller or digital signal processor). SoC 2400 also includes a memory 2406, which can be any type of random access memory (RAM), a low-latency nonvolatile memory (e.g., flash memory), read only memory (ROM), and/or other suitable electronic data storage. SoC 2400 can also include various firmware and/or software, such as an operating system 2408, which can be computer-executable instructions maintained by memory 2406 and executed by microprocessor 2404. SoC 2400 can also include other various communication interfaces and components, wireless LAN (WLAN) or PAN (WPAN) components, other hardware, firmware, and/or software.

SoC 2400 includes controller 104, which may include various components of FIG. 2 as well. Controller 104 in SoC 2400, either independently or in combination with other entities, can be implemented as computer-executable instructions maintained by memory 2406 and executed by microprocessor 2404 to implement various embodiments and/or features described herein, such as offset 3D printing of parallel, non-parallel, curved, and/or linear filaments and/or smoothing surfaces with multi-stage filaments. Controller 104 may also be provided integral with other entities of the SoC. Alternatively or additionally, controller 104 and the other components can be implemented as hardware, firmware, fixed logic circuitry, or any combination thereof that is implemented in connection with the I/O logic control 2402 and/or other signal processing and control circuits of SoC 2400.

Although the subject matter has been described in language specific to structural features and/or methodological operations, the subject matter defined in the appended claims is not necessarily limited to the specific features or operations described above, including orders in which the operations are performed.

What is claimed is:

1. One or more tangible and non-transitory computer-readable media having instructions stored thereon that, responsive to execution by one or more computer processors, perform a method comprising:
   determining, based on a desired three-dimensional (3D) object intended to be created using 3D printing, a portion of a surface in which support-to-support distances exceed a maximum droop distance of a multi-stage filament intended to be used to create a smoothing surface on the 3D object; and
   creating a 3D production model usable to control a filament-providing element to provide:
      a prior stage of production, the prior stage for the portion of the surface in which support-to-support distances exceed the maximum droop distance, the prior stage including a support structure having intra-contour support for the smoothing surface, the intra-contour support decreasing the support-to-support distances to less than or equal to the maximum droop distance; and
      a later stage of production, the later stage including the smoothing surface applied over the support structure.

2. The media of claim 1, wherein the determining and creating are based on a physical characteristic of a filament head intended to be used to apply the multi-stage filament.

3. The media of claim 1, wherein the smoothing surface includes multiple, multi-stage filaments.

4. The media of claim 1, wherein the 3D production model is further usable to control the filament-providing element effective to provide the smoothing surface and retain an intended dimension of the desired 3D object.

5. The media of claim 1, wherein the 3D production model includes use of parallel or non-parallel offset 3D printing in production of the support structure.

6. A controller configured to control a filament-providing element of a three-dimensional (3D) printing device, and the controller configured to perform actions including:
   determining, using sensor data, whether a formed, physical, three-dimensional (3D) object includes an undesired surface characteristic;
   identifying, responsive to determining that the formed, physical, 3D object does include an undesired surface characteristic and, using the sensor data, the undesired surface characteristic as a multiple filament-width flaw in each of three dimensions; and
   correcting the undesired surface characteristic by applying, over the undesired surface characteristic, one or more filaments as a smoothing surface, at least one of the one or more filaments provided over the multiple filament-width flaw in at least two of the three dimensions.

7. The controller of claim 6, wherein the controller is further capable of causing the filament-providing element to alter a temperature of, or speed of application of, the at least one of the one or more filaments, the alteration effective to alter a flexibility of the at least one of the one or more filaments.

8. The controller of claim 6, wherein the provision of the smoothing surface provides the at least one of the one or more filaments over the multiple filament-width flaw in the three dimensions.

9. The controller of claim 6, wherein the sensor data comprises measurements of the 3D object including filament locations, angles, and widths.

10. The controller of claim 6, wherein applying the smoothing surface comprises applying multiple stages of filament.

11. The controller of claim 10, wherein the multiple stages of filament comprise a continuously applied single filament.

12. A three-dimensional (3D) printing device comprising:
   a filament-providing element; and
   a controller configured to:
      determine, based on a desired 3D object to be created using the 3D printing device, a portion of a surface in which support-to-support distances exceed a maximum droop distance of a multi-stage filament intended to be used to create a smoothing surface on the 3D object; and
      create a 3D production model usable to control the filament-providing element to provide:
         a prior stage of production, the prior stage for the portion of the surface in which support-to-support distances exceed the maximum droop distance, the prior stage including a support structure having intra-contour support for the smoothing surface, the intra-contour support decreasing the support-to-support distances to less than or equal to the maximum droop distance; and
         a later stage of production, the later stage including the smoothing surface applied over the support structure.

13. The 3D printing device of claim 12, wherein the determination and creation are based on a physical characteristic of a filament head to be used to apply the multi-stage filament.

14. The 3D printing device of claim 12, wherein the smoothing surface includes multiple, multi-stage filaments.

15. The 3D printing device of claim 12, wherein the smoothing surface includes a single multi-stage filament.

16. The 3D printing device of claim 12, wherein the 3D production model is further usable to control the filament-providing element effective to provide the smoothing surface and retain an intended dimension of the desired 3D object.

17. The 3D printing device of claim 12, wherein the 3D production module includes use of parallel or non-parallel offset 3D printing in production of the support structure.

18. The 3D printing device of claim 12, wherein the smoothing surface is applied in each of three dimensions.

19. The 3D printing device of claim 12, the maximum droop distance determined in filament widths based on a desired flexibility of the smoothing surface.

20. The 3D printing device of claim 12, wherein the intra-contour support comprises multiple non-parallel intra-contour supports.

* * * * *